US006859326B2

(12) United States Patent
Sales

(10) Patent No.: US 6,859,326 B2
(45) Date of Patent: Feb. 22, 2005

(54) RANDOM MICROLENS ARRAY FOR OPTICAL BEAM SHAPING AND HOMOGENIZATION

(75) Inventor: Tasso R. M. Sales, Rochester, NY (US)

(73) Assignee: Corning Incorporated, Corning, NY (US)

(*) Notice: Subject to any disclaimer, the term of this patent is extended or adjusted under 35 U.S.C. 154(b) by 40 days.

(21) Appl. No.: 10/298,689

(22) Filed: Nov. 18, 2002

(65) Prior Publication Data

US 2004/0130790 A1 Jul. 8, 2004

Related U.S. Application Data

(60) Provisional application No. 60/412,170, filed on Sep. 20, 2002.

(51) Int. Cl.⁷ .............................................. G02B 27/10
(52) U.S. Cl. ..................................................... 359/619
(58) Field of Search ............................ 359/15, 19, 558, 359/559, 573, 575, 618, 619, 626, 628, 707, 708, 737

(56) References Cited

U.S. PATENT DOCUMENTS

| 5,042,911 | A | * | 8/1991 | Levin | 359/619 |
|---|---|---|---|---|---|
| 5,534,386 | A | | 7/1996 | Peterson et al. | 430/320 |
| 5,589,982 | A | | 12/1996 | Faklis et al. | 359/565 |
| 6,033,094 | A | | 3/2000 | Sohn | 362/332 |
| 6,212,011 | B1 | * | 4/2001 | Lissotschenko et al. | 359/619 |
| 6,278,550 | B1 | | 8/2001 | Kathman et al. | 359/599 |
| 6,373,633 | B1 | * | 4/2002 | Brown | 359/618 |

OTHER PUBLICATIONS

"Uniform illumination of large targets using a lens array"; X. Deng, X. Liang, Z. Chen, W, Yu, and R. Ma; Applied Optics, vol. 25 No. 3, Feb. 1, 1986; pp 377–381.

"Design and performance of a refractive optical system that converts a Gaussian to a flattop beam"; J.A. Hoffnagle and C.M. Jefferson; Applied Optics, vol. 39 No. 30, Oct. 20, 2000; pp 5488–5499.

"Dual–wavelength operation diffractive phase elements for pattern formation"; I.M. Barton, P. Blair, and M.R. Taghizadeh; OpticsExpress, vol. 1 No. 2, Jul. 21, 1997, pp 54–59.

"Integrated diffractive and refractive elements for spectrum shaping"; S, Noach, A, Lewis, Y. Arielli, and N. Eisengerg; Applied Optics, vol. 35 No. 19, Jul. 1, 1996, pp 3635–3639.

"A method of forming optical diffusers of simple known statistical properties"; P. F. Gray; Optica Acta, vol. 25 No. 8, 1978, pp 765–775. Apr.

"Reshaping collimated laser beams with Gaussian profile to uniform profiles"; CY Han, Y., Ishii, and K. Murata; Applied Optics, vol. 22 No. 22, Nov. 15, 1983, pp 3644–3647.

* cited by examiner

Primary Examiner—Georgia Epps
Assistant Examiner—Alicia M. Harrington
(74) Attorney, Agent, or Firm—Thomas B. Ryan; Mark W. Lauroesch; Ronald J. Paglierani

(57) ABSTRACT

Microlens arrays are defined with microlens elements that differ from each other in accordance with a probability distribution for shaping an optical beam having a prescribed intensity profile within a desired far-field scatter pattern. The differences include random variations in a sag profile corresponding to a surface shape of the microlenses, a boundary profile corresponding to a boundary of the microlenses, and a spatial distribution corresponding to the relative position of the microlenses within the array. The sag profile variations can be used to homogenize an intensity profile of the optical beam. The boundary profile variations within an irregular spatial distribution can be used to apply the prescribed intensity profile of the optical beam within the desired scatter pattern.

71 Claims, 34 Drawing Sheets

Uniform Square
Full Divergence: 4.4° (532nm)
Diameter range: 80 – 200 μm
Total sag ~ 10 μm
Index: 1.6
Test wavelength: 633nm Uniform Rectangle
Full Divergence: 9.2°×18.4° (532nm)
Diameter range: 80 – 160 μm
Total sag ~ 26 μm
Index: 1.6
Test wavelength: 633nm Annulus
Full Divergence: 5° (532nm)
Diameter range: 300 μm
Total sag ~ 16 μm
Index: 1.6
Test wavelength: 633nm Simply connected region Multiply connected region Set of simply connected regions Set of multiply connected regions

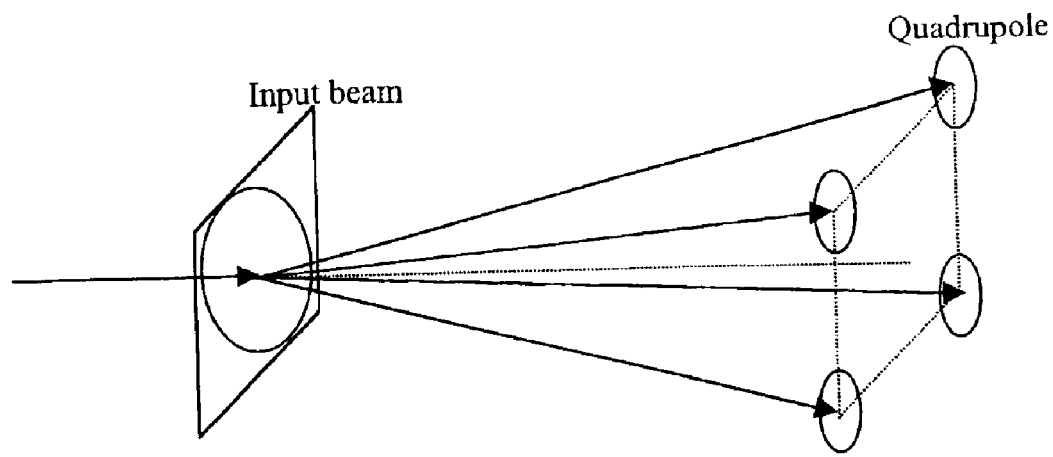
FIG. 24A
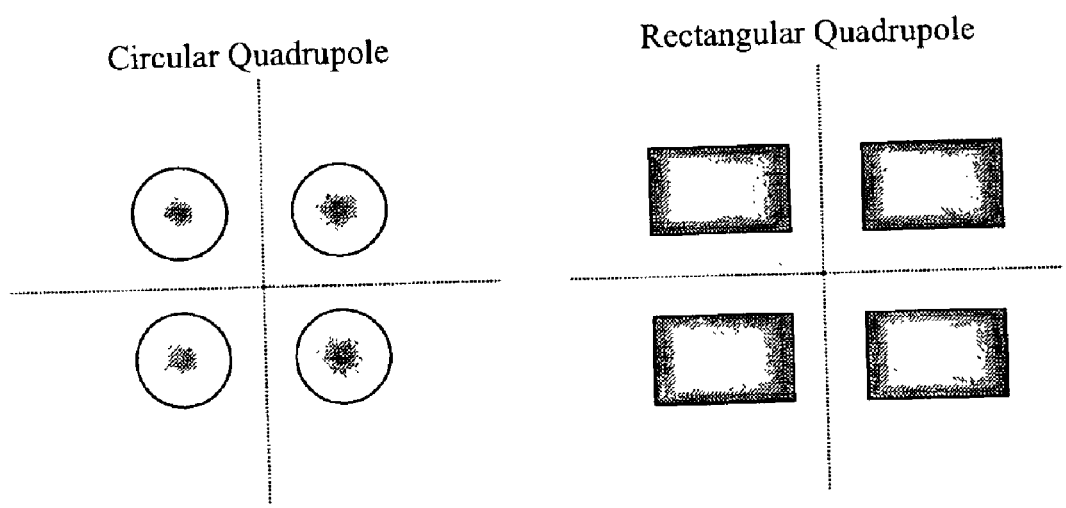
Circular Quadrupole
FIG. 24B
Rectangular Quadrupole
FIG. 24C
FIG. 24

RANDOM MICROLENS ARRAY FOR OPTICAL BEAM SHAPING AND HOMOGENIZATION

This application claims the benefit of U.S. Provisional Application No. 60/412,170, filed on 20 Sep. 2002, which provisional application is incorporated by reference herein.

TECHNICAL FIELD

The invention relates to optical devices based on microlens arrays that are capable of modifying or shaping intensity functions of input illumination into distinct intensity functions observed a distance away from the devices. The capabilities for modifying intensity functions include homogenization by reducing strong variations in the scattered intensity distribution. Applications of such microlens arrays include diffusers, screens, homogenizers, and beam shapers.

BACKGROUND

Beam shaping refers to the transformation of the intensity profile of an initial input beam into a distinct profile a distance away from the beam-shaping devices. Often, beam shaping is desired in such a form that it deviates considerably from the natural shaping provided by free propagation alone (i.e., diffraction). Consequently, it often becomes necessary to employ beam-shaping devices to modify the nature of the propagating beam and thereby provide the desired shaping function.

A simple form of beam shaping and homogenization is provided by Gaussian diffusers, which include a surface with random height variations. Ground glass and some types of chemically etched glass surfaces are used to provide such random height variations. Gaussian diffusers uniformly spread an input illumination beam over a limited angle range with Gaussian intensity profile. Such beam shapers are inexpensive and easy to fabricate but provide very limited beam-shaping capabilities.

Another type of diffusion-based beam shaper having homogenization capabilities can be fabricated by holographic exposure of laser speckle patterns. These so-called "holographic diffusers" provide some advantages over Gaussian diffusers by providing more flexibility in beam shaping, such as by spreading light with distinct angular divergence along two directions. Exact divergence can also be better controlled. However, the typical intensity scatter profile for holographic diffusers is also Gaussian. Other intensity profiles could in principle be obtained; but the holographic method of fabrication assumes a device with the desired intensity profile already exists, which limits the usefulness of the method. Furthermore, in reconstruction, a zero order (straight-through) beam would also be present in addition to the desired pattern. These drawbacks limit the usefulness of holographic components to anything other than a Gaussian spread of light.

Another approach to achieving beam shaping and homogenization is based on diffractive elements, which use interference and diffraction effects to shape an input beam into a variety of patterns. Problems with diffractive elements arise when large divergence angles are required, since diffractive elements achieve light spreading by reducing surface feature sizes (small features lead to large scattering angles). As divergence angles increase, it becomes harder to fabricate diffractive elements, which are typically limited to angles below ±20 degrees. Diffractive elements are also best suited for monochromatic operation and are generally designed to operate at a specific wavelength. At other wavelengths, a strong undiffracted zero-order beam component appears. Diffractive elements can be designed to operate at discrete wavelength values; but for broadband operations, such devices offer poor performance, with the zero order being the main source of degradation.

Beam flattening, such as the conversion of an incident Gaussian beam into a beam that presents flat intensity over some angular span, can also be undertaken by diffractive elements, which suffer the disadvantages mentioned previously. Aspheric lenses have also been used for beam flattening; but aspheric lenses present difficulties relating to fabrication, alignment, limited depth of field, and sensitivity to input beam variations.

Regular microlens arrays have been previously used for near-field homogenization, but these arrays produce strong diffraction patterns away from the array as well as image artifacts such as moire effects in screen applications. Regular microlens arrays have also been used for illumination purposes but provide limited spatial shaping (polygonal energy distribution) and limited intensity control (spherical or aspheric lens profiles on a regular array) away from the array.

Some other beam-shaping transformations require the exclusion of light from some portions of the scattered pattern (i.e., "holes" in the scatter pattern). Except for diffractive elements, prior methods have been unable to provide beam-shaping capabilities that include such multiply-connected scatter patterns.

SUMMARY OF INVENTION

The invention provides for improvements in devices containing microlens arrays for shaping illuminating beams, such that the illuminating beams traverse the devices, are modified by the devices, and recombine away from the devices according to a prescribed intensity profile within a desired far-field scatter pattern. The devices are based on arrays of microlenses distributed on substrates. Each microlens is defined by unique values for a set of parameters, which are generally different from the values of the same parameters that define other microlenses in the array. The lens-to-lens variation among the microlenses provides the means to homogenize the luminous energy away from the device. The shape, or sag profile, of each microlens is chosen according to a desired intensity shaping function. The boundary profile and spatial arrangement (relative positioning) of each microlens within the array are chosen to apply the prescribed intensity profile within the desired far-field scatter pattern.

Optical devices arranged in accordance with the invention can be defined by an array of microlenses, where the individual microlenses differ from each other in a random manner characterized by probability distribution functions that govern parameters such as the sag profile, the boundary profile, and the spatial arrangement. The input beam can be shaped or modified into an output beam having a desired intensity function by control of the surface profile of each microlens and its statistical properties. The probability distribution functions can be chosen to further shape the intensity function, particularly with respect to rates of intensity fall off. Similar randomized variations in boundary profile (e.g., diameter) and spatial arrangement apply the desired intensity function over the desired scatter pattern.

An optical beam shaper in keeping with a preferred embodiment of the invention provides for shaping an optical beam according to a prescribed intensity profile within a desired far-field scatter pattern. An array of microlenses is distributed on the substrate. Each microlens is defined within the array by values for a set of parameters that are generally different from values for the same set of parameters that define other microlenses of the array. The parameters include a sag profile corresponding to a surface shape of the microlenses, a boundary profile corresponding to a boundary of the microlenses, and a spatial distribution corresponding to the relative position of the microlenses within the array. The sag profile is varied between the microlenses of the array to homogenize the intensity profile of the optical beam. The boundary profile is varied between the microlenses of the array within an irregular spatial distribution to apply the prescribed intensity profile within the desired far-field scatter pattern of the optical beam.

The sag profile is preferably varied between the microlenses of the array according to a probability distribution function. More particularly, the sag profile is preferably defined by one or more random variables that satisfy the probability distribution function within an allowed range. The random variables can include radii of curvature, conic constants, and aspheric coefficients of a sag function that mathematically describes the sag profile.

The boundary profile of at least some of the microlenses is a conforming boundary that scatters evenly powered portions of the optical beam into a matching shaped far-field scatter pattern. The conforming boundaries preferably have polygonal, circular, or other smooth curved shapes. The boundary profile of other of the microlenses is a non-conforming boundary that scatters evenly powered portions of the optical beam into a far-field pattern that does not match the shape of the non-conforming boundary. The non-conforming boundaries generally have more complex shapes, such as piecewise curved shapes formed by contiguous sections of conforming boundaries.

Generally, the microlenses with conforming boundaries are arranged in a spatial distribution that minimizes remaining intervening areas for the microlenses with non-conforming boundaries, which fill the spaces on the substrate in between the microlenses with conforming boundaries. Both the microlenses with conforming boundaries and the microlenses with non-conforming boundaries exhibit focusing power. In addition, the microlenses with conforming boundaries preferably have a random arrangement of different conformal boundaries according to a probability distribution function. For example, the different conformal boundaries can randomly vary in size within a limited range.

Ordinarily, the far-field scatter pattern of the optical beam is a simply connected region having a shape that matches an average shape of the microlenses with conforming boundaries. However, the far-field scatter pattern of the optical beam can also be formed as a multiply-connected region. For example, the sag profile can be defined by a sag function containing a phase singularity for producing a null in the far-field scatter pattern. Alternatively, the microlenses with conforming boundaries could be grouped together and spaced apart by microlenses with non-conforming boundaries to produce spatially isolated sections of the optical beam.

The substrate on which the microlens array is supported is preferably a transmissive substrate having opposing first and second sides. In addition to locating the microlens array on a first side of the substrate, a diffusing element can be located on the second side of the substrate for further homogenizing or shaping the illuminating beam. The diffusing element can take various forms including a roughened surface, a holographically exposed pattern, a diffractive pattern, a grating, a polarizing surface, a lens, and another lens array.

The beam shaper of the invention is particularly well suited to achieving a uniform (flat) intensity profile within the desired far-field scatter pattern, although other intensity profiles are also possible. The intensity fall-off rates apart from the central profile can also be controlled using probability distribution functions that exhibit differing rates of decline. The shape of the far-field intensity pattern can be controlled by the boundary profile and spatial distribution parameters of the microlenses. Typical far-field scatter patterns include circular, square, rectangular, and annular scatter area. Scatter patterns can also be formed with generally distinct angular divergence along two perpendicular directions. In addition, the far-field scatter pattern can be formed by a multiplicity of spatially separated beams with specified intensity distributions.

Another aspect of the invention provides an apparatus for beam shaping and homogenization that includes a first random microlens array, a substrate, and a second random microlens array located on the surface opposite to the first microlens array. The first microlens array, substrate, and second microlens array are generally made of different materials, but can also be made of similar materials. Furthermore, the first microlens array can also differ from the second microlens array in microlens properties, distribution, and statistics.

In another aspect of the invention, an apparatus for beam shaping and homogenization is provided that includes a first random microlens array, a substrate, and a second pattern located on the surface opposite to the first microlens array. The first microlens array, substrate, and second pattern are generally made of different materials, but can also be made of similar materials. Furthermore, the second pattern can be constituted of a variety of structures including, but not limited to, ground diffusers, holographically exposed patterns, diffractive patterns, gratings, polarizing surfaces, lenses, or lens arrays.

Additional features and advantages of the invention will be set forth in the detailed description which follows and in part will be readily apparent to those skilled in the art from that description or recognized by practicing the invention as described herein, including the detailed description which follows, the claims, as well as the appended drawings.

DRAWINGS

FIGS. 1A and 1B reference a global coordinate system that locates any point in the array and coordinate frame local to each microlens unit.

FIG. 2 is a section of a random microlens array on material of index $n_m$, on a substrate of index $n_s$. The incident and transmitted media have index $n_0$. Also shown is the path for two rays through a particular microlens unit.

(FIG. 7A) square packing and (FIG. 7B) hexagonal packing.

Figure 14A:
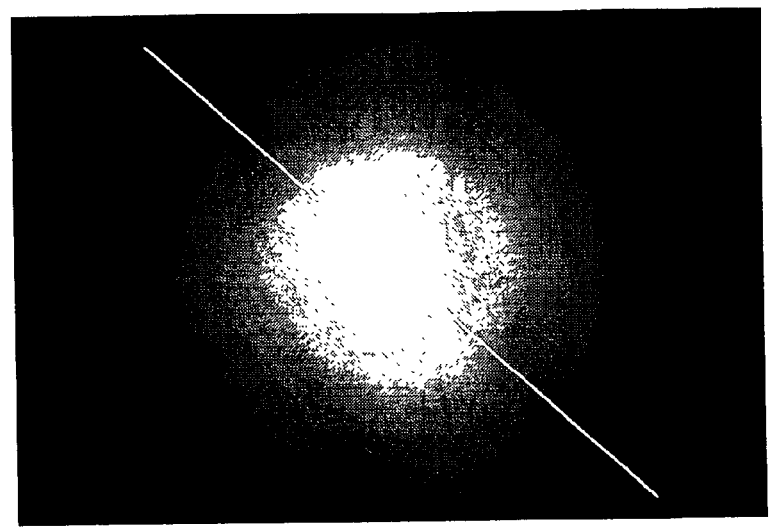
Figure 14B:
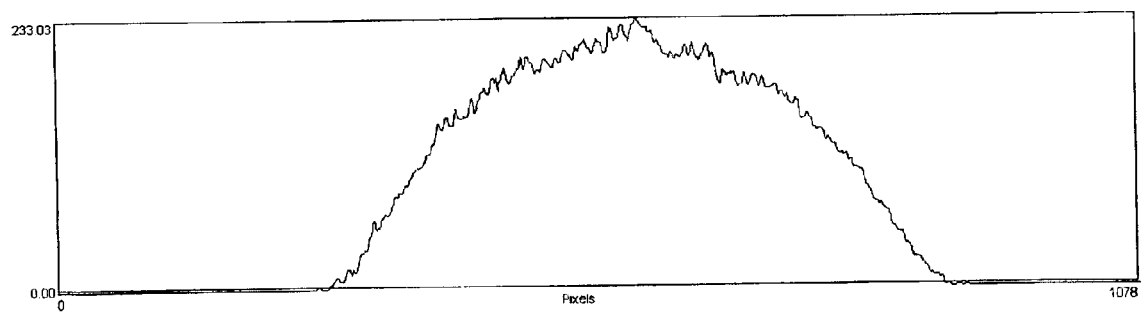

FIGS. 14A and 14B equate a measured scatter profile to a scatter pattern formed by a random microlens array that projects into a circular scatter area.

Figure 15A:
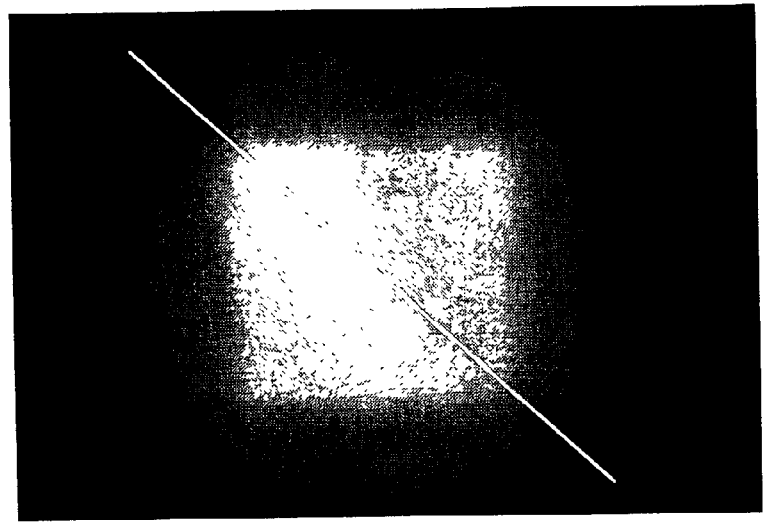
Figure 15B:
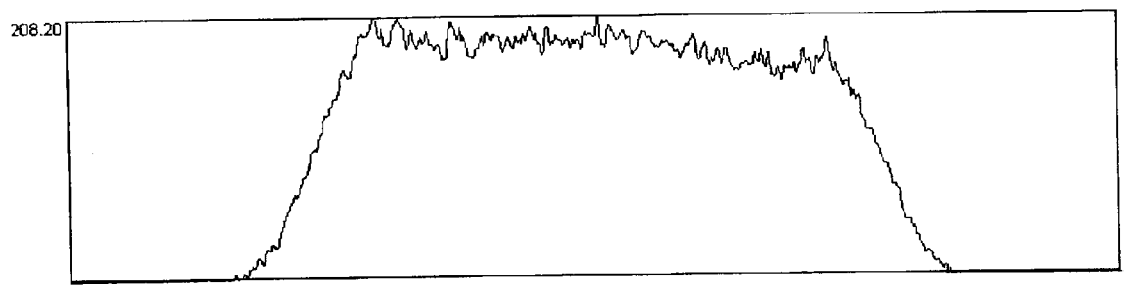

FIGS. 15A and 15B equate a measured scatter profile to a scatter pattern formed by a random microlens array that projects into a square scatter area and uniform (flat) intensity profile.

Figure 16A:
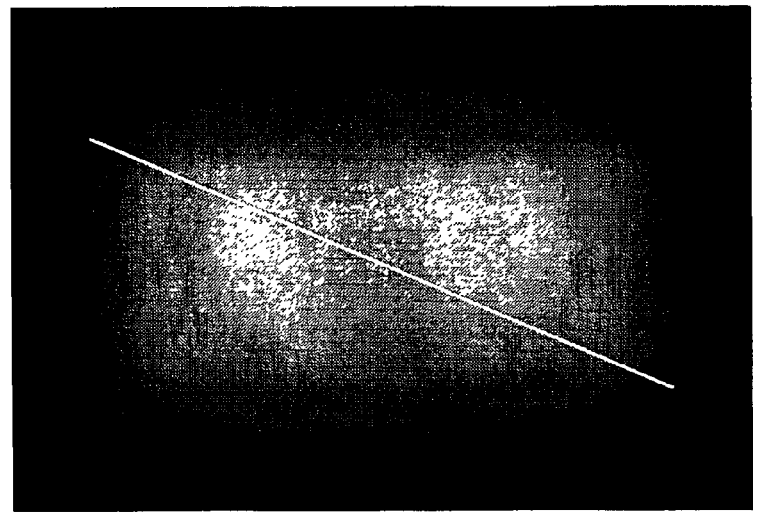
Figure 16B:
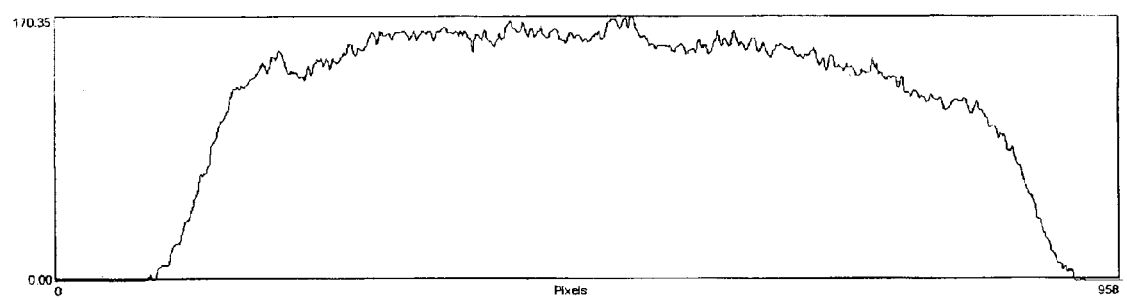

FIGS. 16A and 16B equate a measured scatter profile to a scatter pattern formed by a random microlens array that projects into a rectangular scatter area and uniform (flat) intensity profile.

Figure 17A:
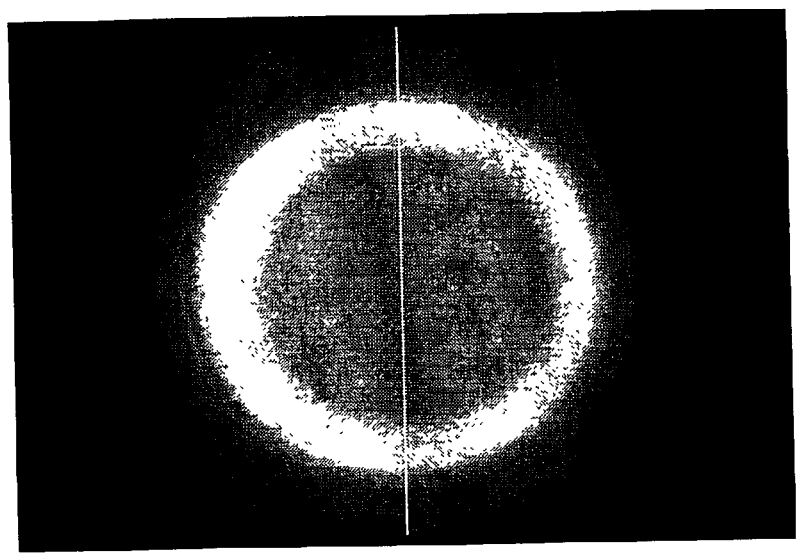
Figure 17B:
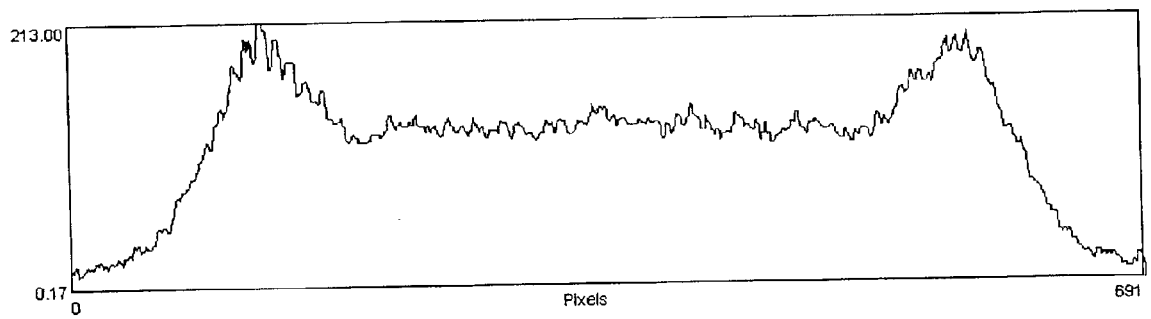

FIGS. 17A and 17B equate a measured scatter profile to a scatter pattern formed by a random microlens array that projects into an annular scatter area and center uniform (flat) intensity profile.

Figure 18:
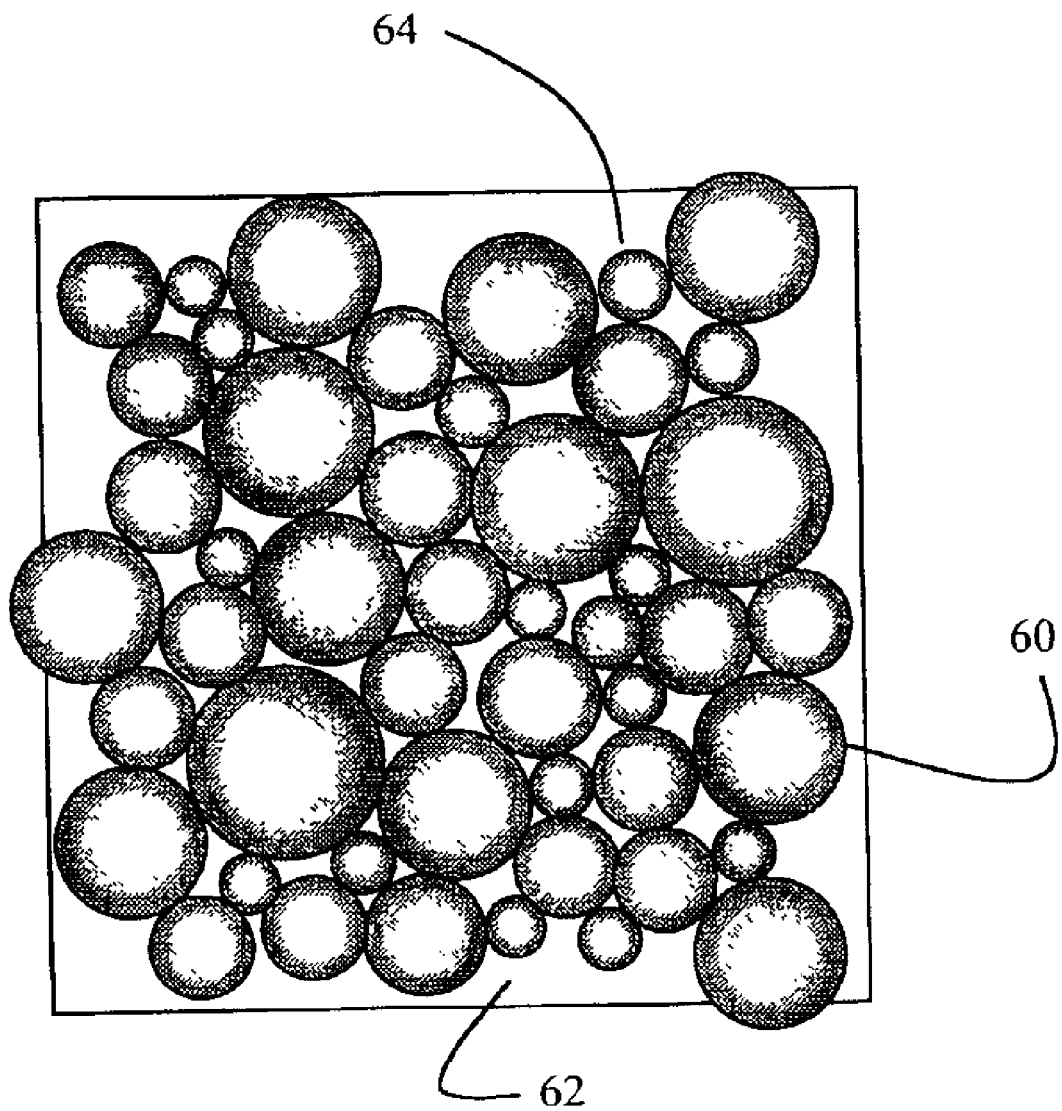

FIG. 18 is an illustration of a random tiling of the array plane with variable-size circles.

FIG. 19 is an illustration of a random tiling of the plane with variable-size circles and superposed cells with plane-filling square and rectangular shapes.

Figure 20:
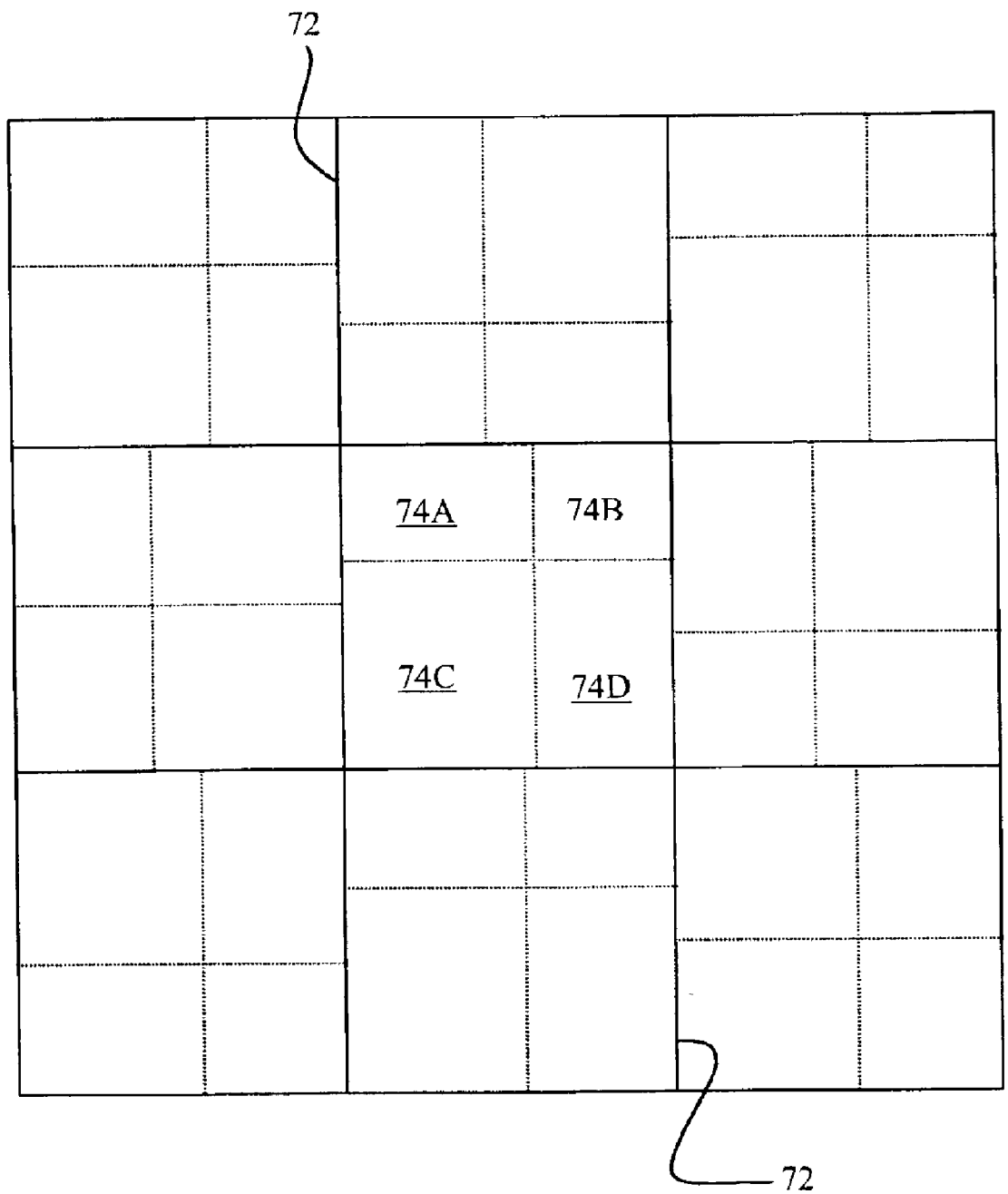

FIG. 20 is an illustration of a method to cover the plane with variable-size rectangles starting from a regular square cell grid.

Figure 21:
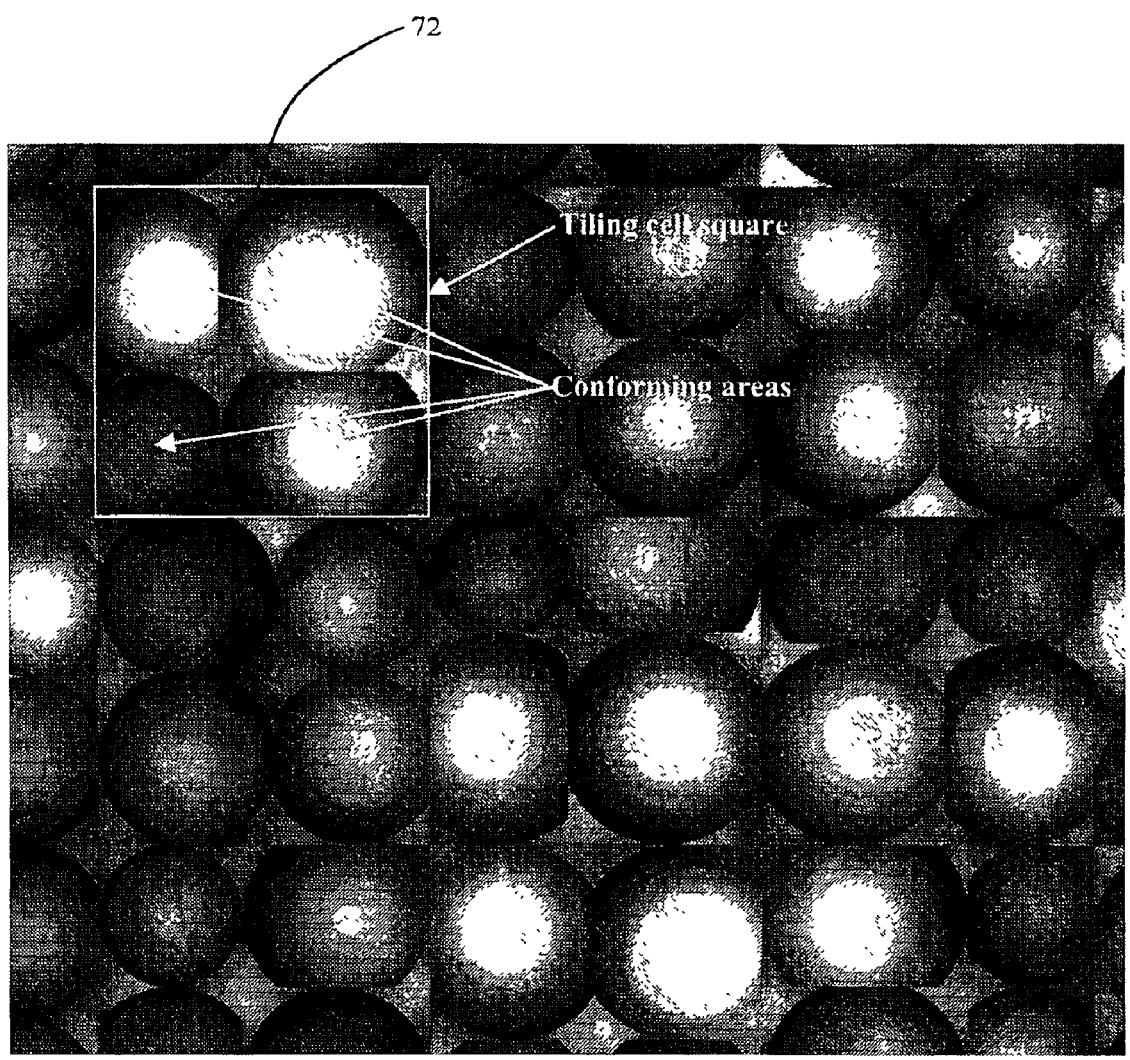

FIG. 21 is an illustration of a random microlens that generates a circular scatter area with variable-size diameters and conforming shapes that deviate from the perfect circle.

FIGS. 22A–22D illustrate (22A) simply-connected and (22B) multiply-connected scatter regions. Also shown are illustrations of scatter patterns with a multiplicity of shapes containing individual (22C) simply-connected and (22D) multiply-connected regions.

Figure 23:
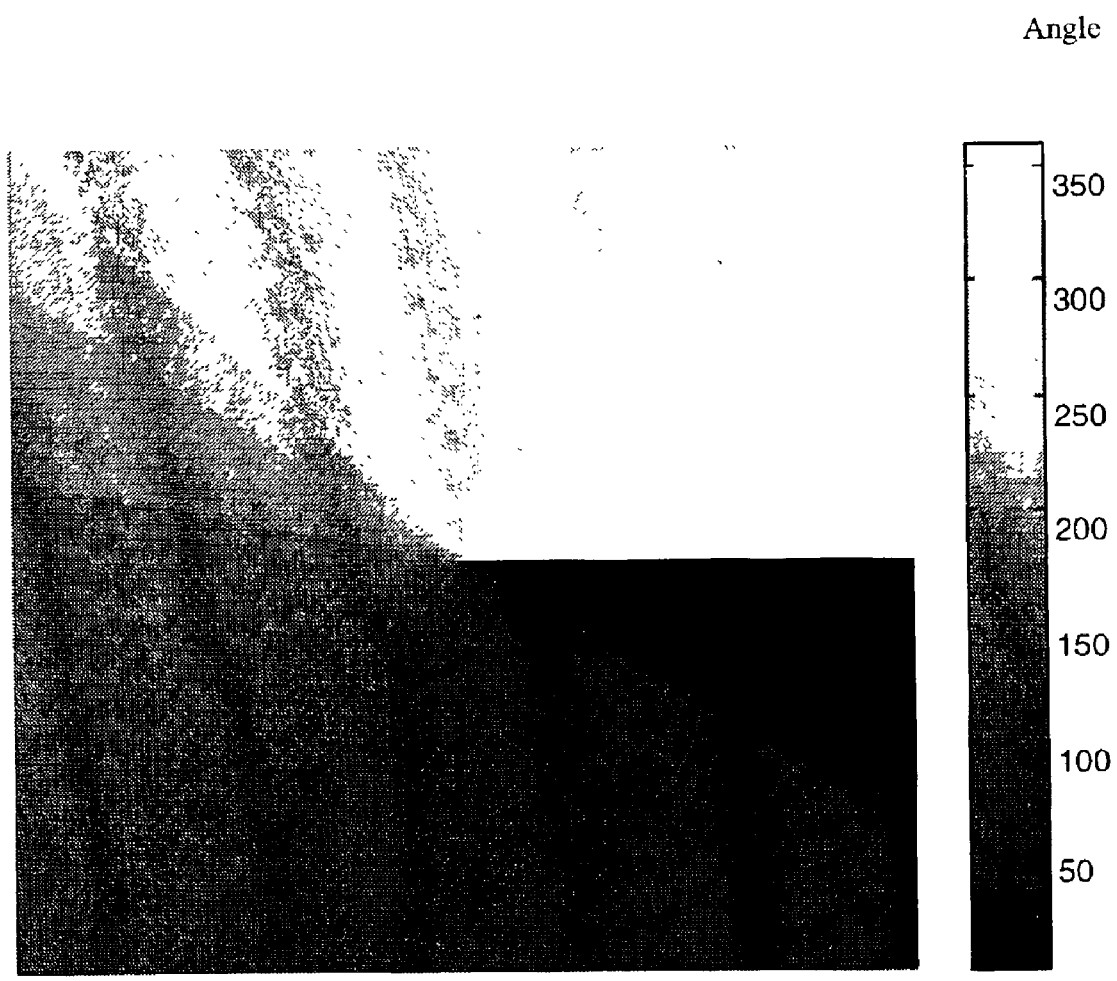

FIG. 23 is a top view of angular coordinate variation.

FIGS. 24A–24C illustrate an input beam spreading into four separate beams (a quadrupole pattern). Also shown are illustrations where the individual beams of the quadrupole present (24B) circular and (24C) rectangular boundaries.

Figure 25:
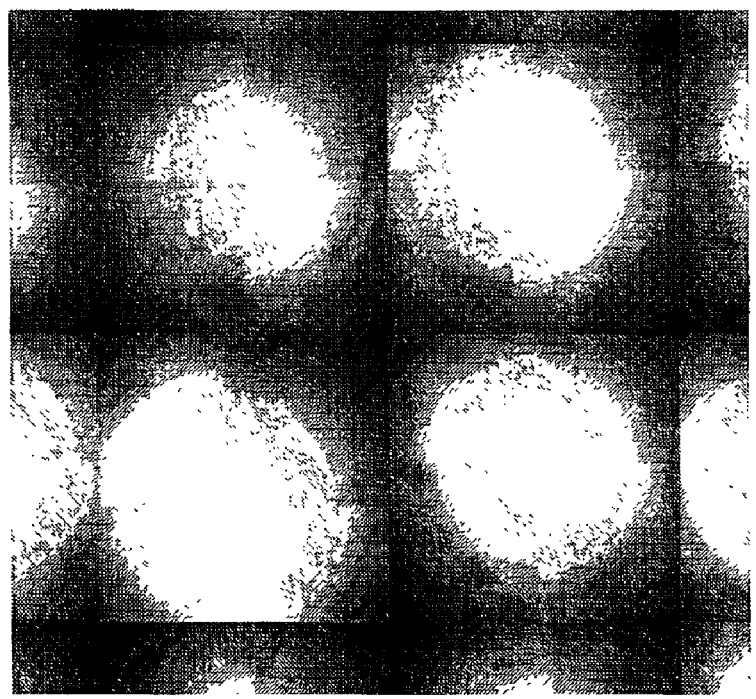

FIG. 25 is an illustration of a section of a random microlens array that generates a quadrupole and incorporates an angular dependence in the sag profile.

Figure 26:
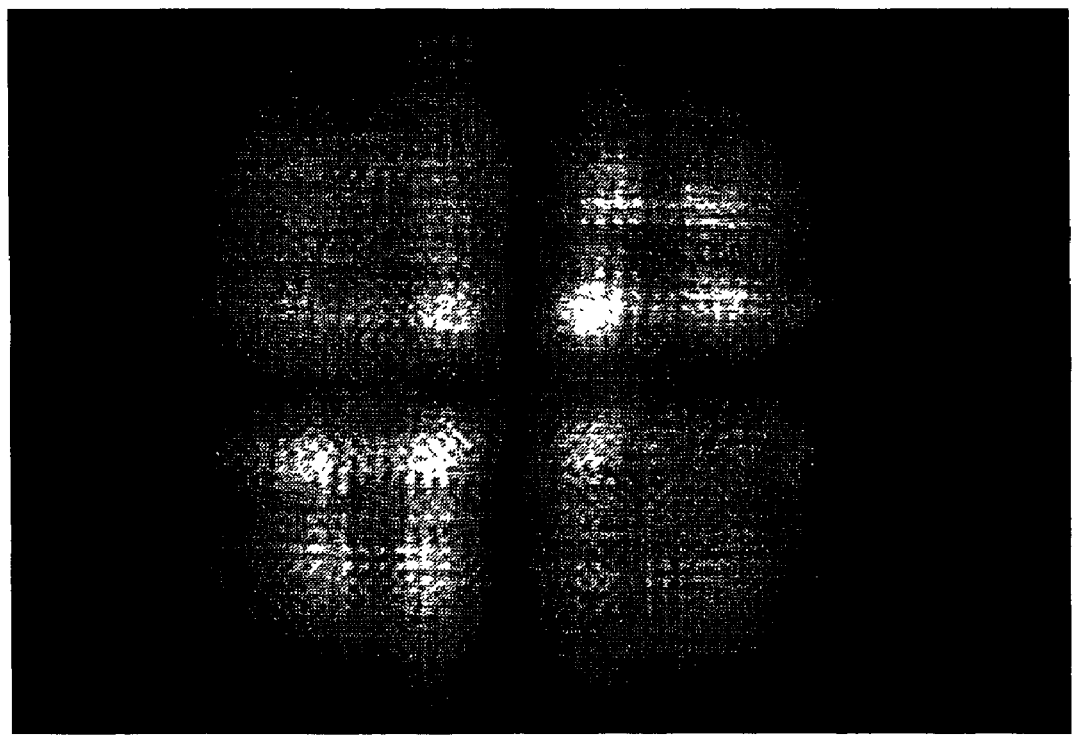

FIG. 26 is a measured scatter pattern produced by the microlens array illustrated in FIG. 25.

Figure 27:
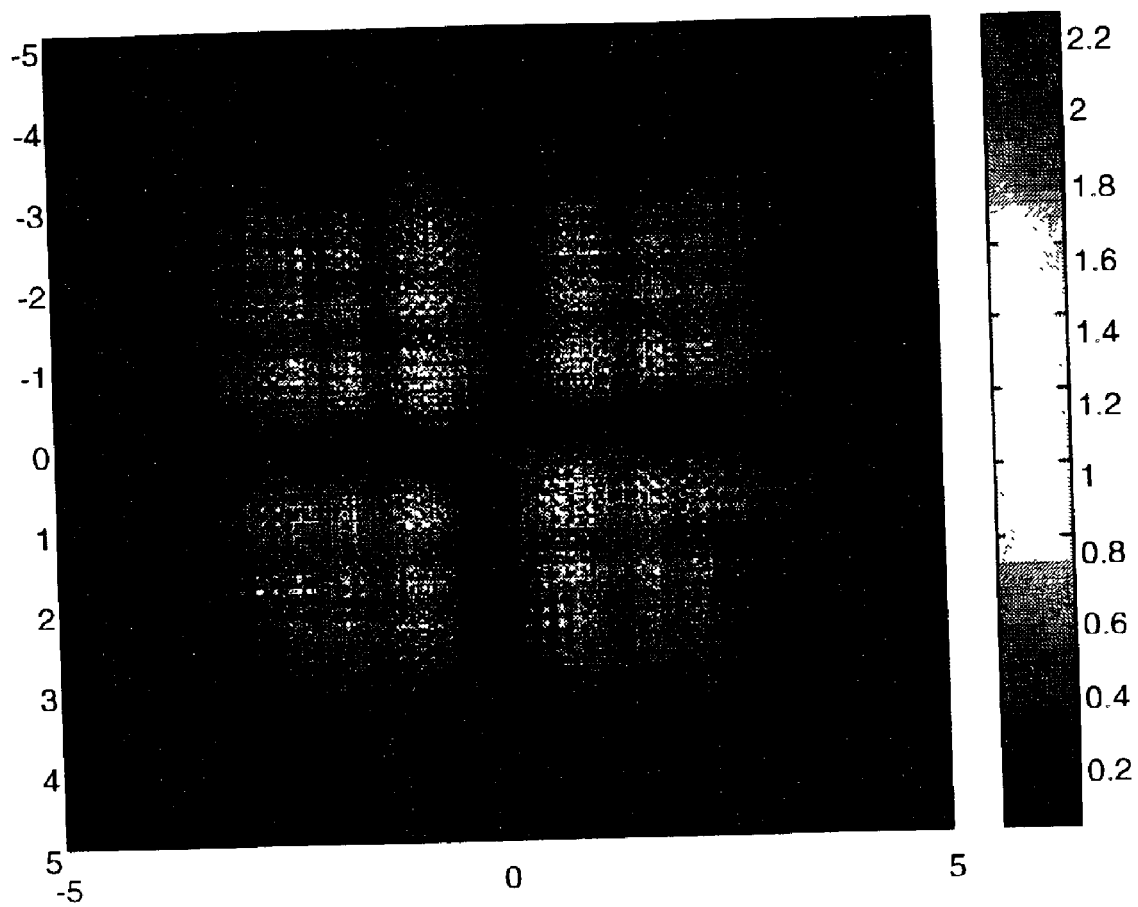

FIG. 27 is a predicted theoretical scatter pattern produced by the microlens array illustrated on FIG. 25.

Figure 28:
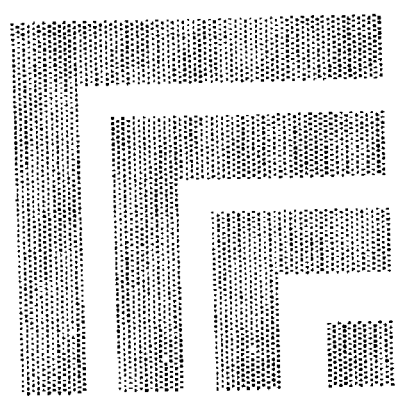

FIG. 28 is an example of a target scatter image to be generated by a random microlens array.

Figure 29:
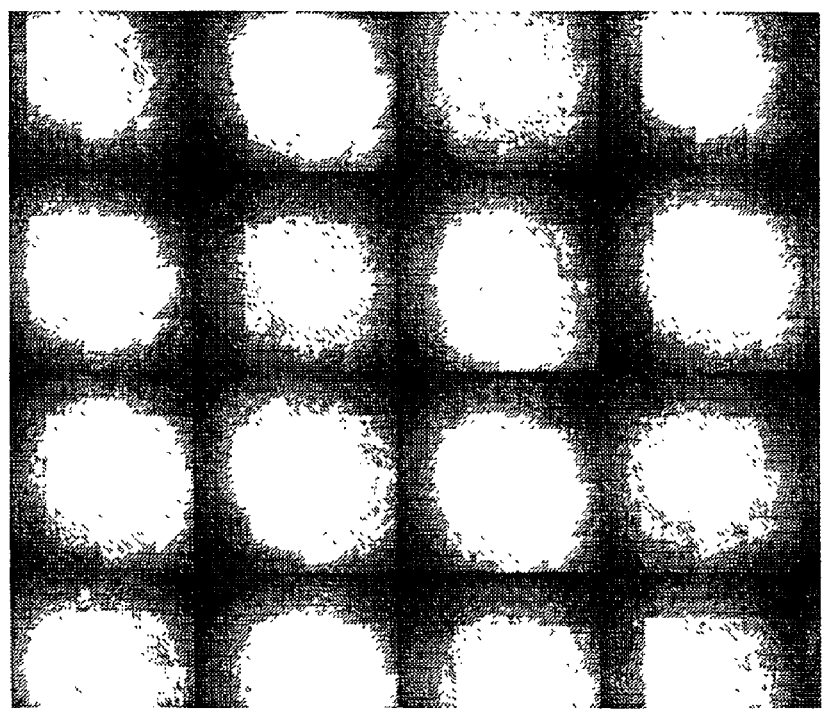

FIG. 29 is an illustration of a section of a random microlens array that generates the scatter profile indicated on FIG. 28.

Figure 30:
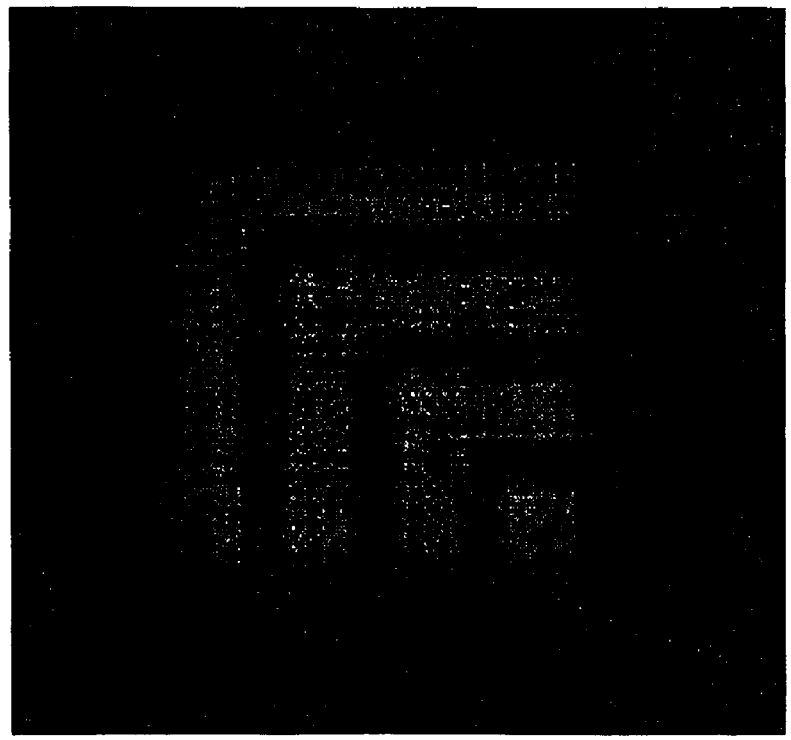

FIG. 30 is a predicted theoretical scatter pattern produced by the microlens array illustrated on FIG. 29.

Figure 31:
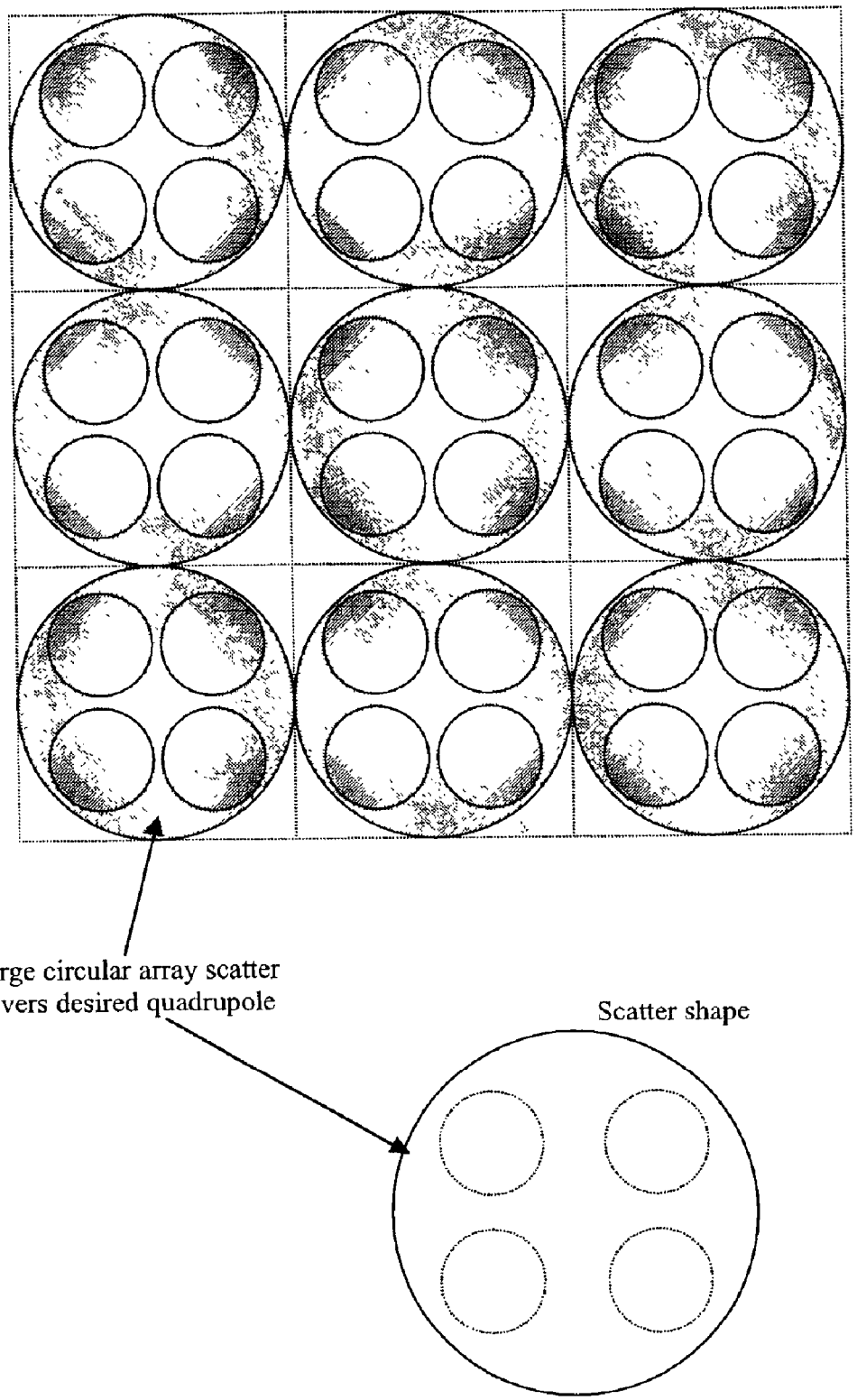

FIG. 31 is a schematic of a microlens array that generates a quadrupole with circular boundaries.

Figure 32A:
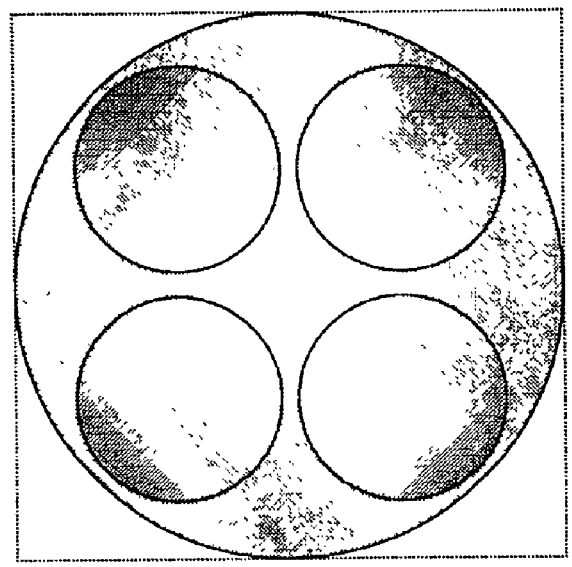
Figure 32B:
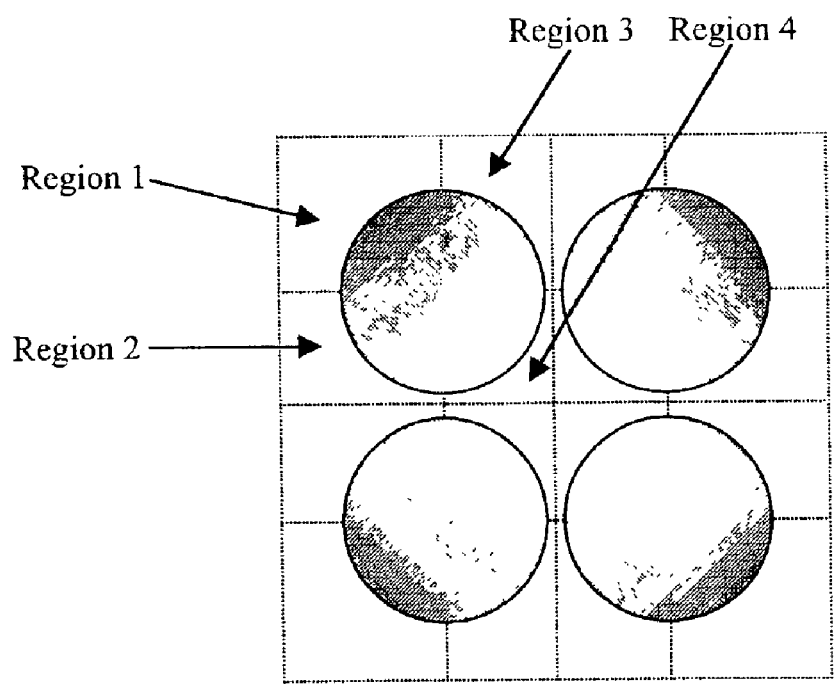

FIGS. 32A and 32B identify conforming and non-conforming regions for an array that generates a quadrupole.

Figure 33:
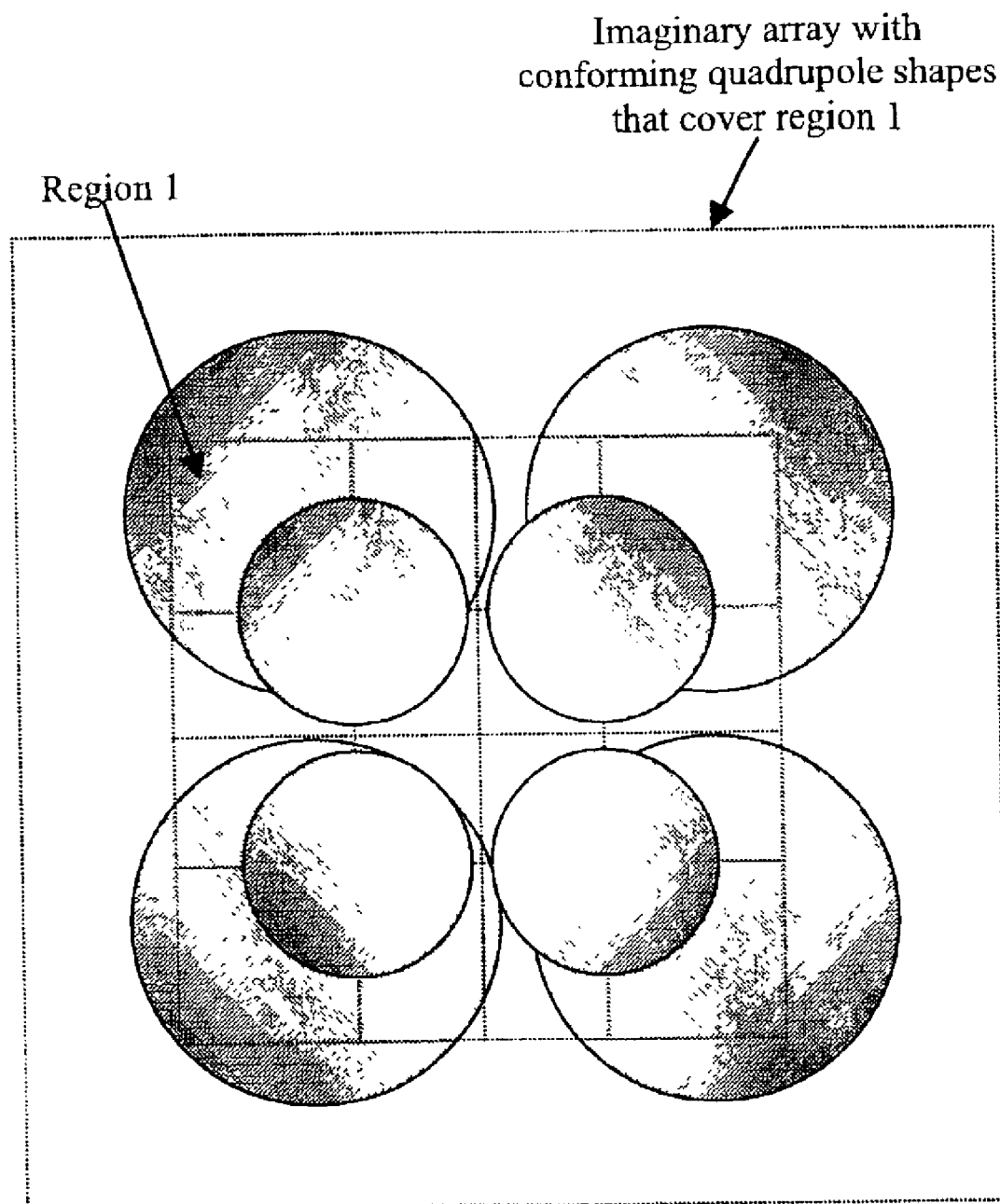

FIG. 33 is a sag assignment for a non-conforming region of a quadrupole generator.

Figure 34:
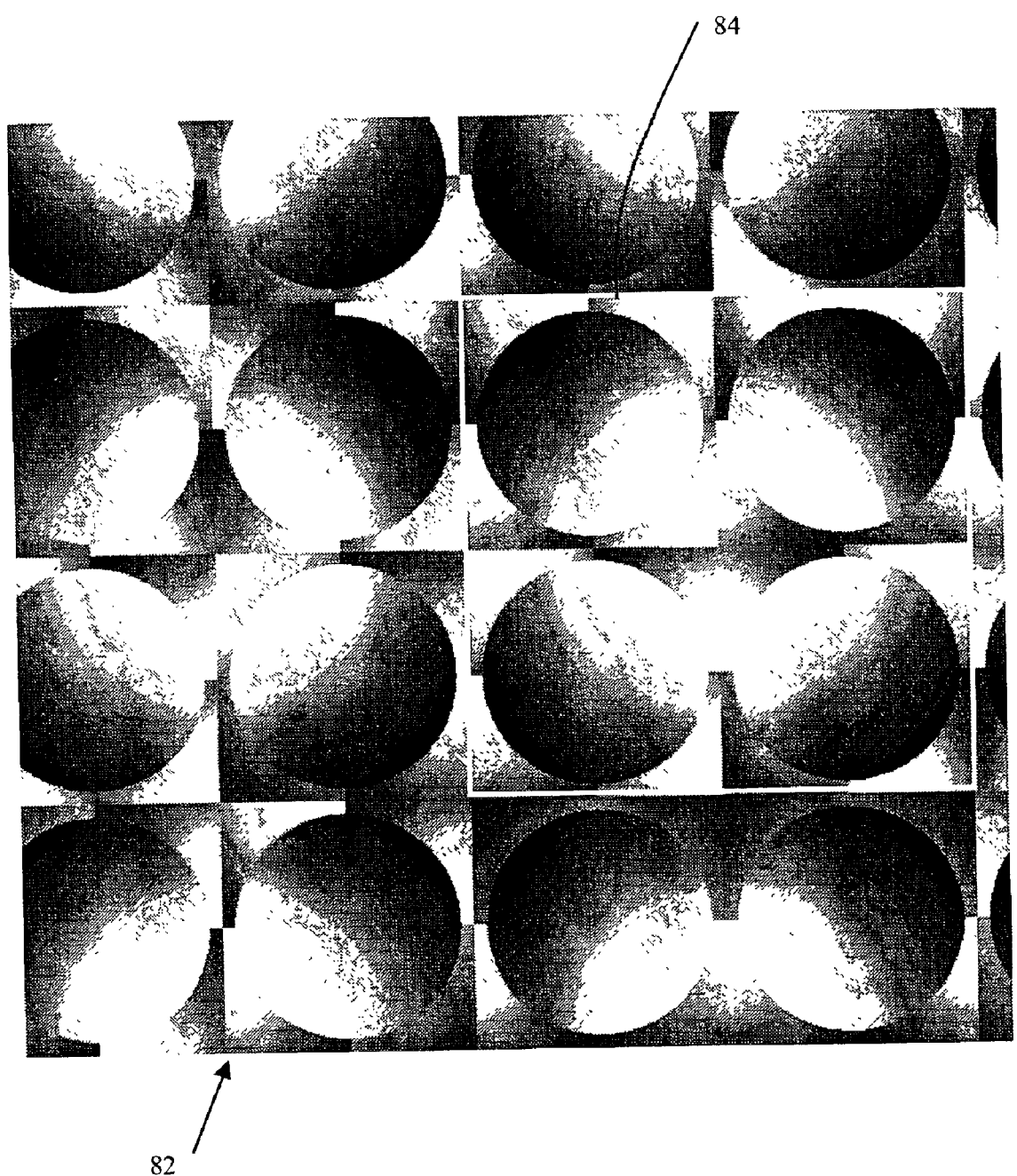

FIG. 34 is an illustration of a section of a microlens array that projects a quadrupole where each beam has a circular scatter shape.

Figure 35:
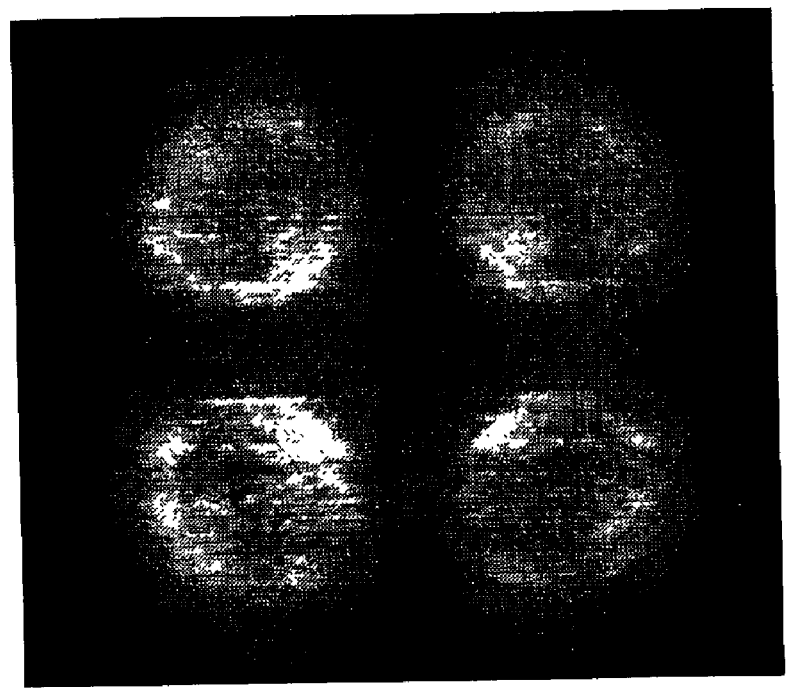

FIG. 35 is a measured scatter profile from a random microlens array that projects into a quadrupole where each beam has a circular scatter shape.

Figure 36:
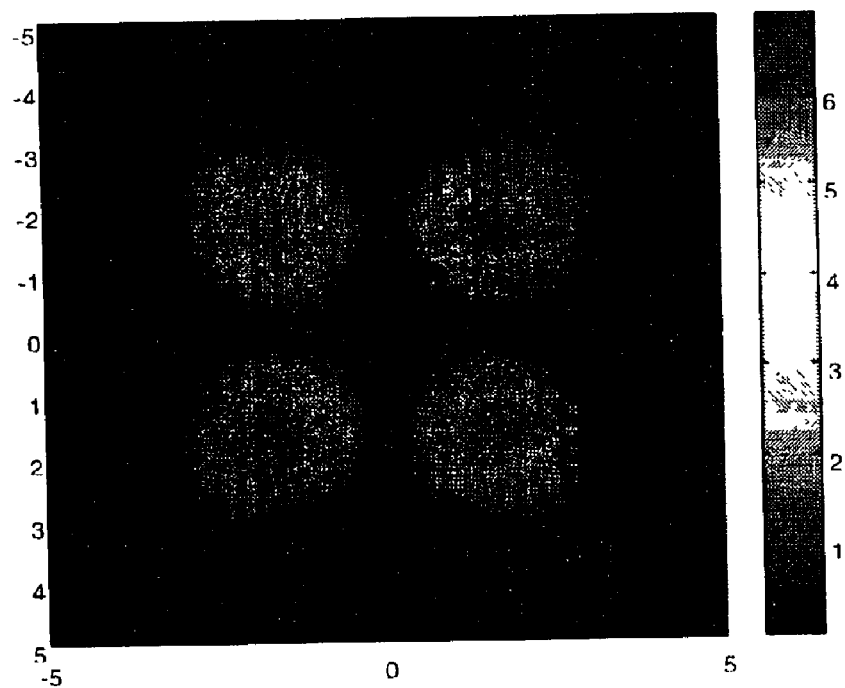

FIG. 36 is a predicted theoretical scatter profile from a random microlens array that projects into a quadrupole where each beam has a circular scatter shape.

Figure 37:
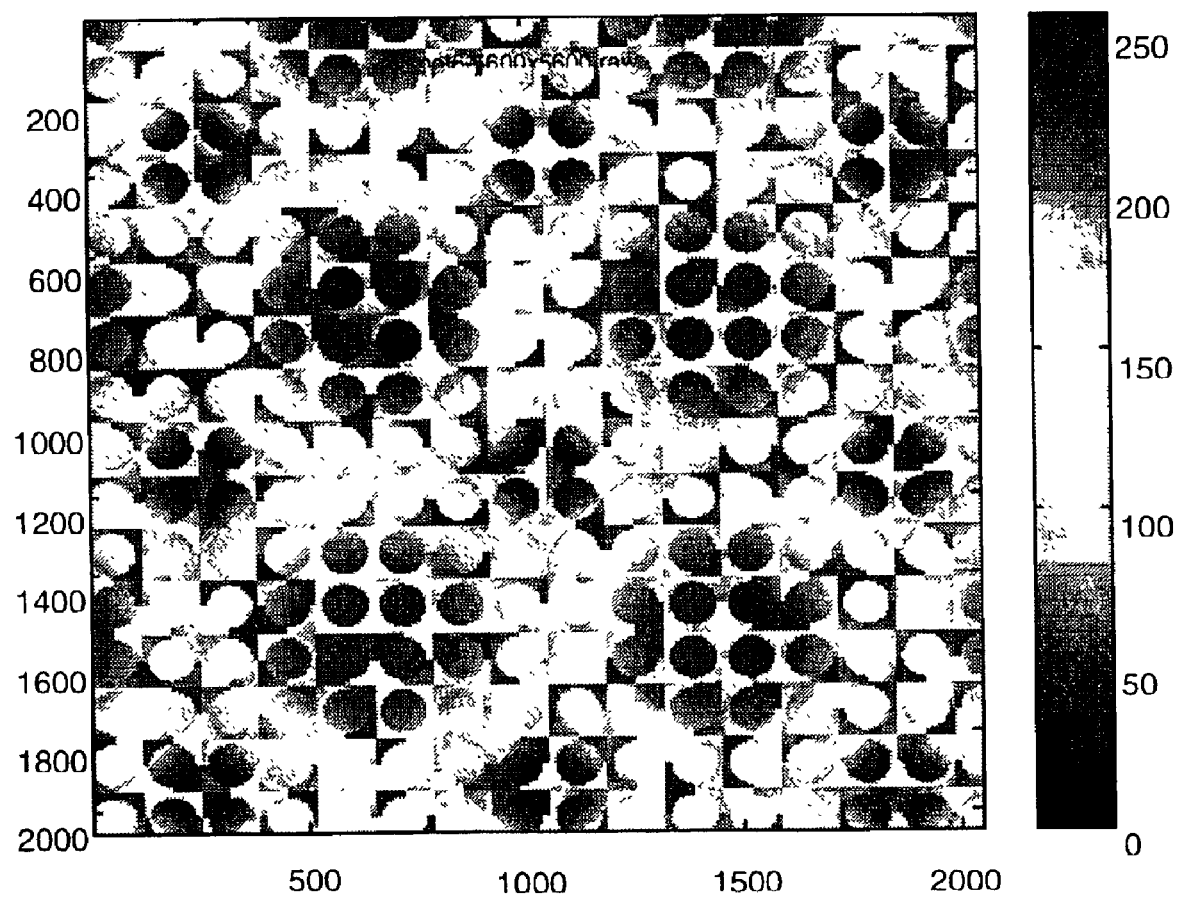

FIG. 37 is an illustration of a random microlens array that generates a scatter pattern of 36 separate beams on a 6×6 array.

Figure 38A:
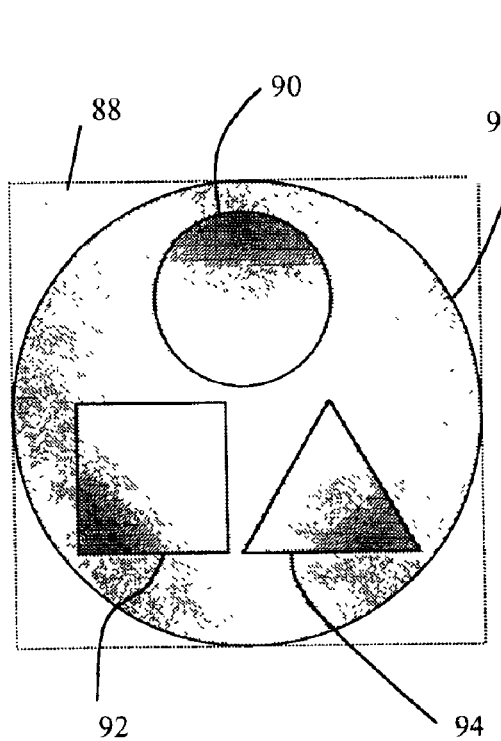
Figure 38B:
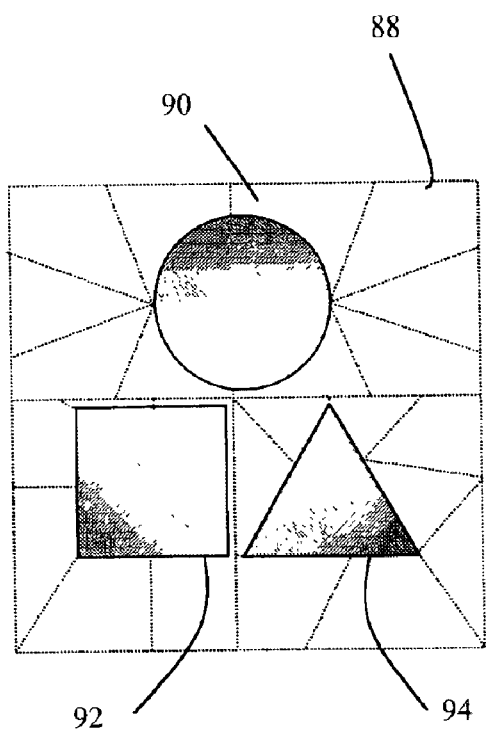
Figure 38C:
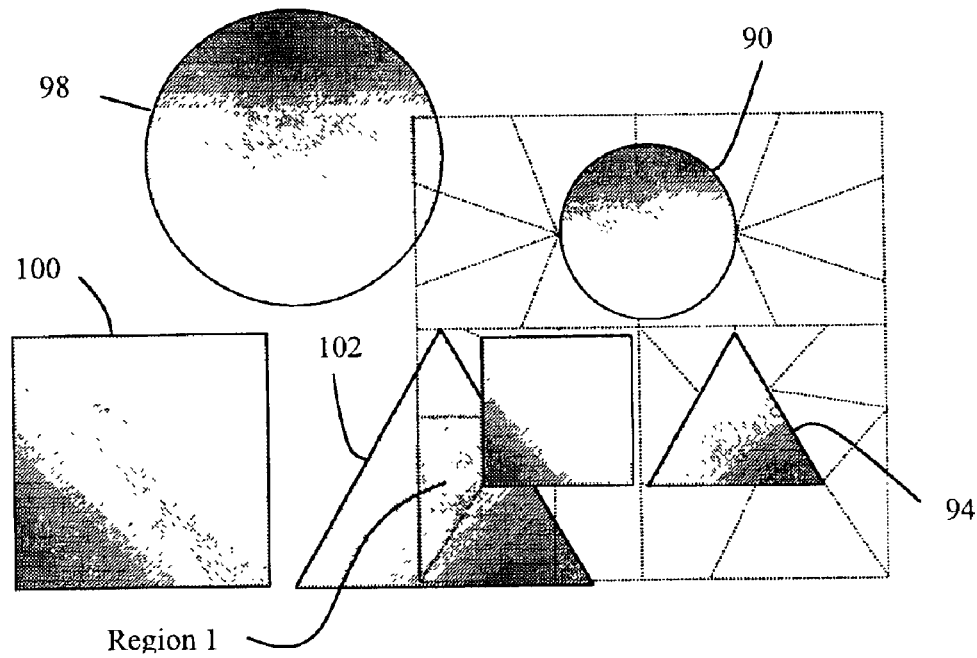

FIGS. 38A–38C illustrate a unit cell of a random microlens array that projects an input beam into arbitrary scatter areas, composed of possibly different shapes. Also shown is an illustration of non-conforming shapes and their sag assignment process.

Figure 39:
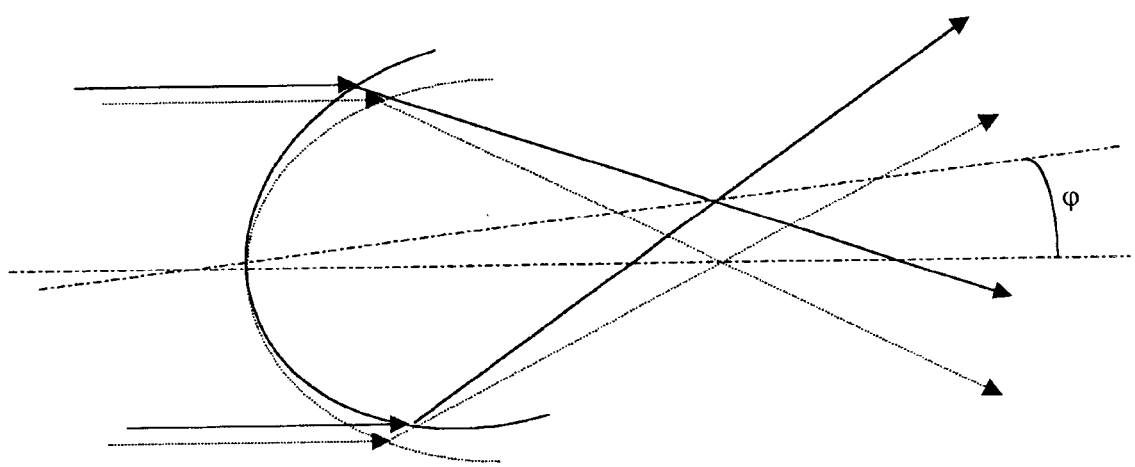

FIG. 39 is an illustration of the focusing by microlenses with (solid curve) and without (dotted curve) tilt.

Figure 40:
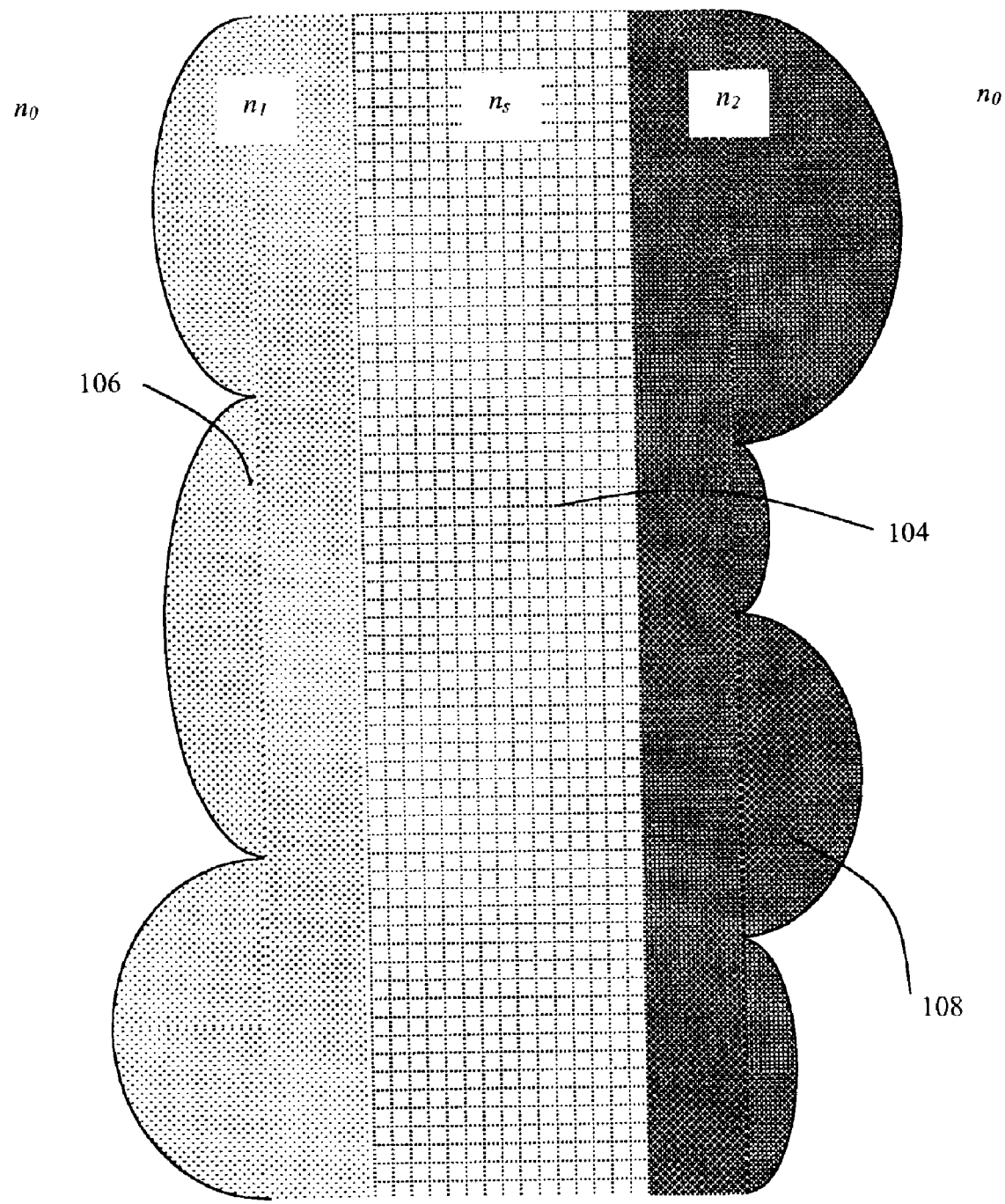

FIG. 40 is an illustration of a substrate with random microlens arrays on both of its sides. In general, the microlens arrays present different indices of refraction, which can also differ from the substrate and external medium.

Figure 41:
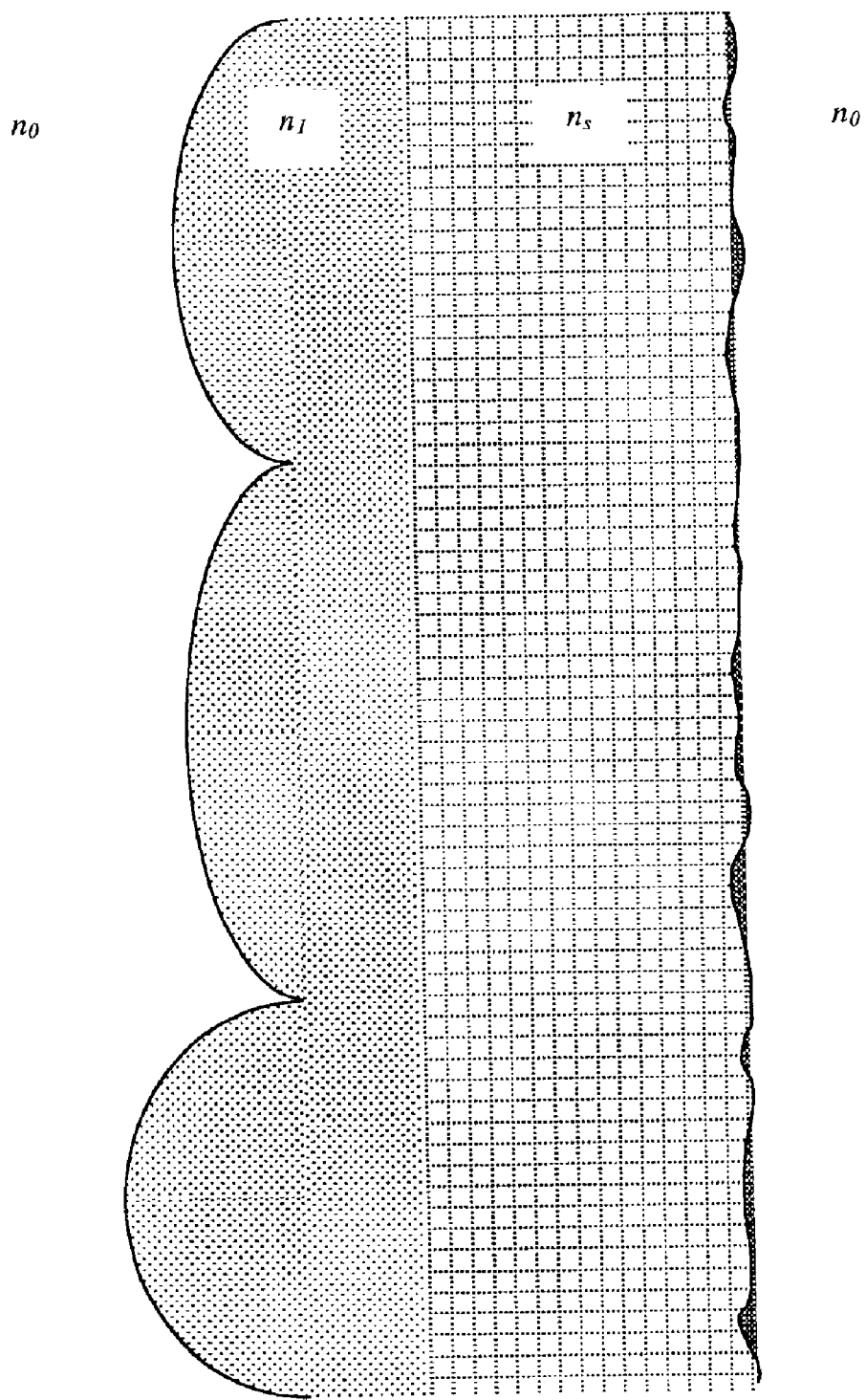

FIG. 41 is an illustration of a substrate with random microlens arrays on one side and a patterned surface on the opposite side. Examples of the kinds of pattern include ground, holographically exposed, and diffractive surfaces.

Figure 42:
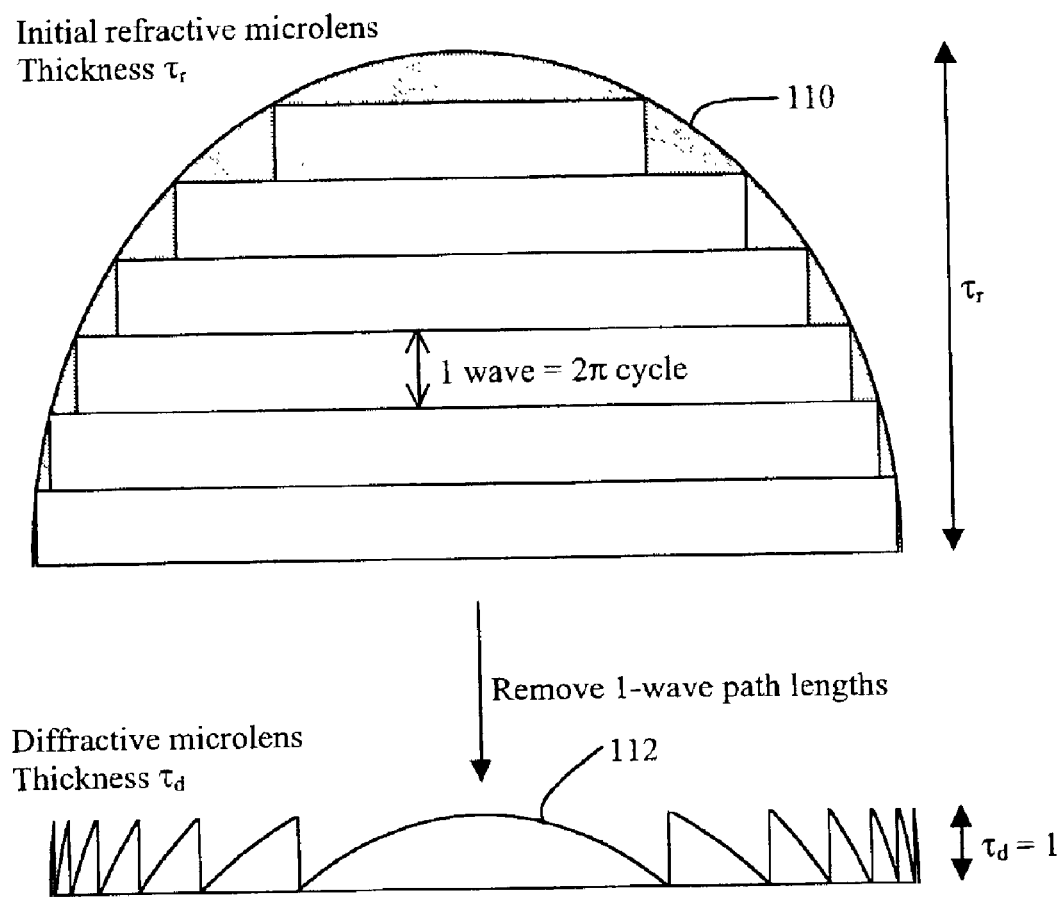

FIG. 42 represents a definition of a diffractive microlens unit from a refractive one.

DETAILED DESCRIPTION

Figure 1A:
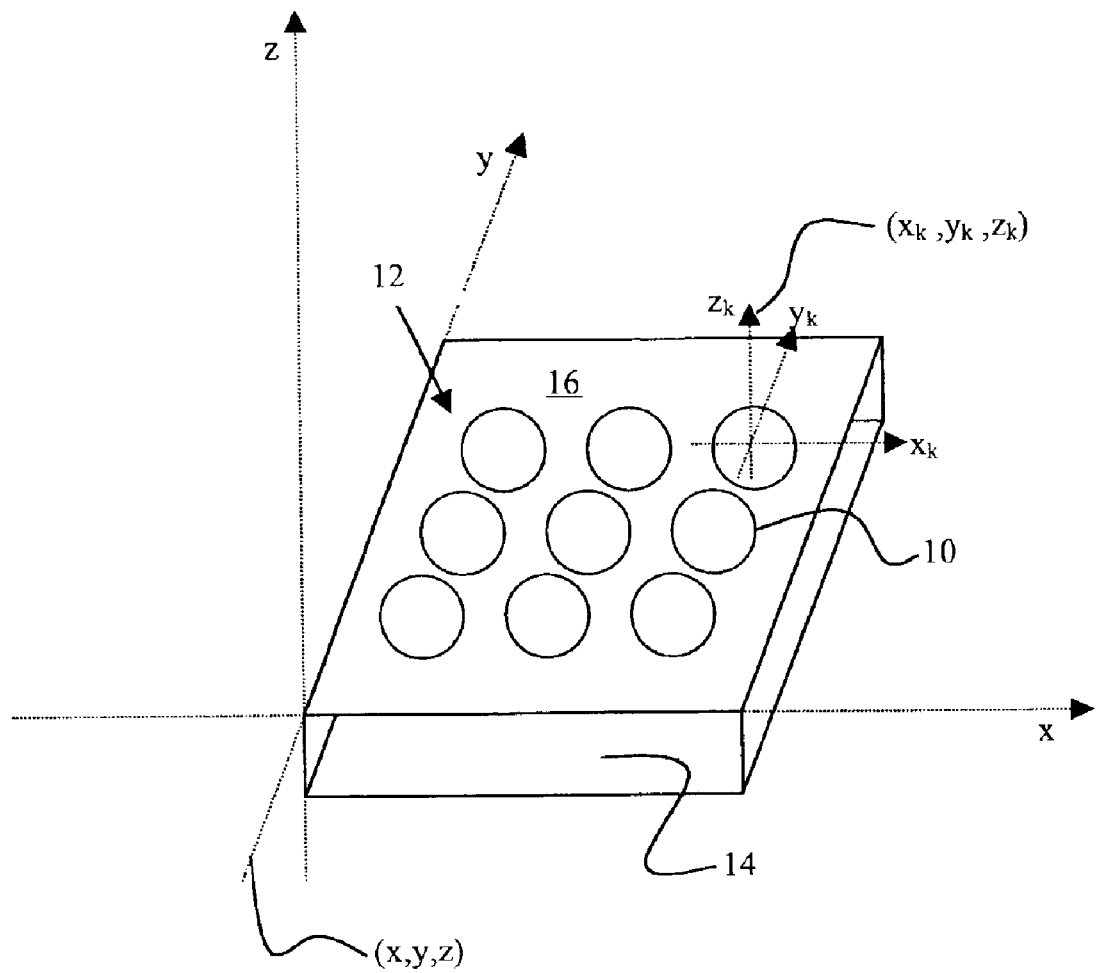
Figure 1B:
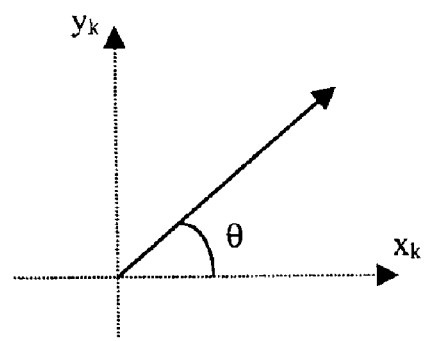

An embodiment of the invention referenced by FIGS. 1A and 1B relies on randomized microlenses 10 arranged in an array 12 on a substrate 14 to provide beam shaping and homogenization of input illumination. The substrate 14 upon which microlenses 10 are fabricated can be made from a variety of transmissive materials, including glass and plastic, that are capable of supporting or fabricating the microlenses 10. A surface 16 of the substrate 14 in which the microlenses 10 are formed can be divided into a number N of sections, where each section has identified with it a microlens structure, defined by particular values of a set of parameters. The microlenses 10 within each of the sections N of the substrate surface 16 can be defined by variables including radii of curvature, conic constants, and aspheric coefficients—all of a sag function mathematically representing the sag profile. The perimeter of an individual section N can assume any form such as a square, a rectangle, a hexagon, a polygon, or any other arbitrary shape. Preferably, the various sections N represent shapes that are of different types and completely cover the substrate so that there is no area devoid of focusing power.

Beam shaping and homogenization rely on three components of the microlens array 12: (i) sag profile of each individual microlens 10, (ii) microlens boundary profile, and (iii) spatial distribution of microlenses 10. Each of these components is considered separately below.

(i) Sag Profile

Before discussing sag profile in more detail, two coordinate systems are introduced whose purpose is to locate regions in the substrate with a unique set of microlens parameters. The two reference frames are: a local reference frame ($x_k$, $y_k$, $z_k$) and a global reference frame (x,y,z). Each of the N regions of the substrate surface 16 is assigned an identifying number ranging from 1 to N. The exact method of number assignment is not particularly important (lexicographic or other), as long as each microlens element in the array is identified. The local frame ($x_k$, $y_k$, $z_k$) serves to define the sag profile of a given microlens 10 independent from any other microlens 10. The global reference frame (x,y,z) locates any specific point across the whole substrate surface 16 where microlenses 10 are located. A representation of these two coordinate systems is shown in FIGS. 1A and 1B.

The sag profile specifies the surface of the microlens 10 and modifies a transmitted beam by determining the direction of rays refracted at its interface. A general form for the sag profile of a microlens on a local reference frame ($x_k$, $y_k$) centered at a point ($x_0$,$y_0$) is given by:

$$s(x_k,y_k) = f(x_k-x_0, y_k-y_0) + \Theta(\theta) \quad (1)$$

where f denotes the functional form of the sag function and $\theta$ represents an angular component to the sag profile, which is dependent on the angular coordinate $\theta$, defined by $\tan\theta = y_k/x_k$.

An example of an explicit expression for function f is shown below:

$$f(u,v) = \frac{c_u u^2}{1 + [1-(\kappa_u+1)c_u^2 u^2]^{1/2}} + \frac{c_v v^2}{1 + [1-(\kappa_v+1)c_v^2 v^2]^{1/2}} + \sum_j A_j^u u^j + A_j^v v^j \quad (2)$$

on a frame defined by coordinates (u,v). In terms of the units shown on Equation (1), the following relations apply: $u = x_k - x_0$ and $v = y_k - y_0$. The quantity c denotes radius of curvature, $\kappa$ is the conic constant, and $A_j$ are aspheric coefficients.

In more general terms, the sag function can be written as a piecewise continuous function with each portion of the profile expressed in the following form:

$$f(u,v) = \sum_{k=1}^{K} \sum_{p=1}^{P} a_{pk} u^p v^k \quad (3)$$

where P and K denote the number of terms retained in the expansion and $a_{pk}$ denotes a second-order coefficient tensor defining the relative contributions to the sag. For an arbitrary intensity scatter profile, the coefficient tensor $a_{pk}$ must be optimized to ensure the desired intensity in the observation plane. This task is best performed by means of numerical optimization search procedures.

The functional form of the microlens sag is directly related to the scattered intensity profile. Therefore, the sag of each microlens 10 needs to be tailored to meet the intensity requirements. Examples of how microlens sag affects scatter profile have been disclosed on U.S. patent application Ser. No. 09/918,408, filed on Jul. 30, 2001, in the names of G. Michael Morris and Tasso R. M. Sales and entitled "STRUCTURED SCREENS FOR CONTROLLED SPREADING OF LIGHT", which is incorporated herein by reference. In a general case, an optimization search is necessary to determine the microlens sag needed for a particular form of scattered intensity profile.

According to the teachings of the present invention, the values of each parameter defining the microlens sag preferably satisfy a probability distribution function (PDF), defining the probability that the parameter assumes a certain value in its allowed range. For example, for the sag profile defined by Equation (2), the radii of curvature, conic constants, and aspheric coefficients represent random variables associated with a PDF. In the general case, each surface parameter can have associated with it a particular PDF, which can also differ from each other. Note that a given design parameter may have associated with it a PDF either directly or indirectly. For instance, consider a microlens array with a sag profile s(x,y) that is described by the parabolic sag function:

$$s(x,y) = \frac{(x-x_0)^2}{2R_x} + \frac{(y-y_0)^2}{2R_y} + s_0 \quad (4)$$

where $R_x$ and $R_y$ denote the radii of curvature along the x and y directions of a local coordinate system and $s_0$ is a constant offset term representing a relative vertical location. There are several alternative methods of randomizing the array. For simplicity, consider the one dimensional case where there is power along one direction only, say x. Also, assume that all microlenses are centered, that is $x_0 = y_0 = 0$. Randomization processes can be applied to any microlens parameter such as: radius of curvature, microlens sag, microlens diameter, divergence angle, focal location, and/or relative vertical location.

Figure 2:
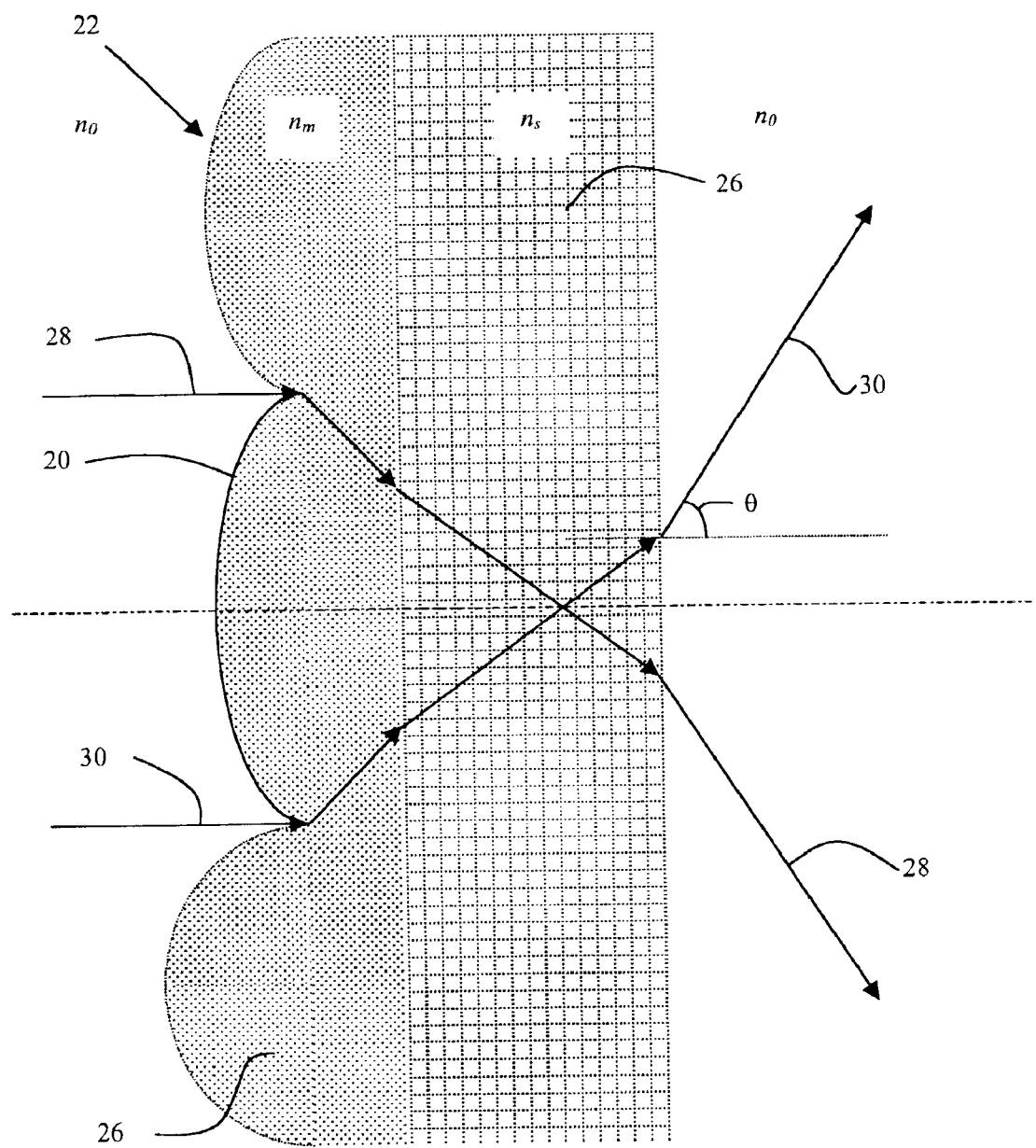

The relative vertical location ($s_0$) can be randomized independently of the other three. For simplicity, let $s_0$ be set to zero, $s_0 = 0$. Not all remaining processes are independent. In fact, specification of some processes automatically determines others. Assume, as shown in FIG. 2, a microlens array 22 on material layer 26 of index $n_m$ on a substrate 24 of index $n_s$, immersed in a medium of index $n_0$, typically air. Then, look at a particular microlens 20 in the array 22 that has diameter D and radius of curvature R. For simplicity, assume the small angle approximation so that $\sin\theta \approx \theta$ and $\tan\theta \approx \theta$. By tracing paraxial rays 28 and 30 through the structure shown on FIG. 2, it can be shown that the following relation is valid:

$$\theta = \frac{D}{R}\left(\frac{n_m}{n_0} - 1\right) \quad (5)$$

with $\theta$ the divergence angle. The focal length f is given by $f = R/(1-n_0/n_m)$ and the maximum lens sag is given by $D^2/2R$. These equations establish the correlation between the different parameters in the paraxial parabolic array. For instance, if the radius of curvature is random with uniform distribution in the range R and R+$\Delta$R, and the diameter is fixed at a constant value D (delta function probability distribution), then the focal length varies within the range $\Delta R/(1-n_0/n_m)$, also with uniform distribution. The maximum sag, however, does not show uniform distribution with a predominance of shallower microlenses. If the paraxial approximation is not valid, exact ray tracing becomes necessary to determine the relation between the various design parameters. In this case, Equation (5) becomes $$n_0 \sin\theta = n_m \sin\left[\arctan\dot{s} - \arcsin\left(\frac{n_0}{n_m}\sin\arctan\dot{s}\right)\right] \quad (6)$$

where the dotted s denotes first derivative of the sag profile. Equation (6) is valid for any form of the sag profile, not only parabolic.

As seen above, it is possible to randomize the microlens array by a number of different methods. Even in the case of a simple one-dimensional parabolic microlens array, there is a variety of approaches leading to distinct array properties. More importantly, the selection of design parameter to be randomized as well as the form of randomization directly affects the functional form of the scattered intensity. As an illustration, consider again the case of a one-dimensional parabolic array where $n_0=1$, $n_m=n_s=1.46$ (see FIG. 2).

Figure 3:
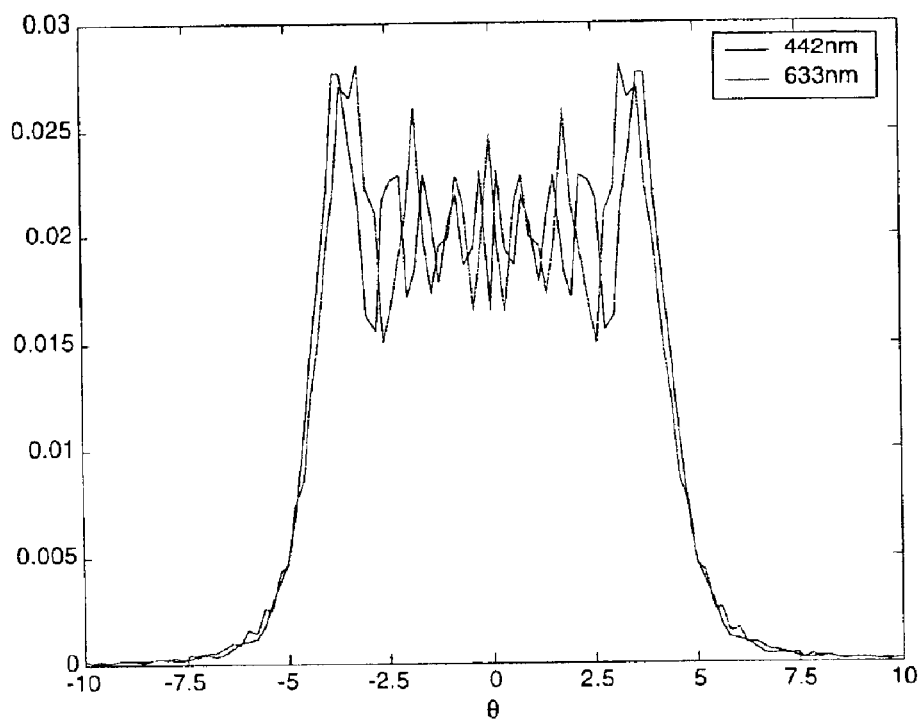
FIG. 3 is a scatter pattern due to a regular array of parabolic microlenses at two distinct values of wavelength.

As a first example, consider an array with a maximum scatter angle of 5 degrees, diameter D=100 microns, and focal length f=573 microns. The selected parameter for randomization is the focal length with variation of $\Delta f=\pm 0.1$ micron and uniform PDF. In other words, the array is nearly regular. The scatter pattern is shown in FIG. 3 (for two values of wavelength: 633 nm and 442 nm), showing rather strong intensity variations.

Figure 4:
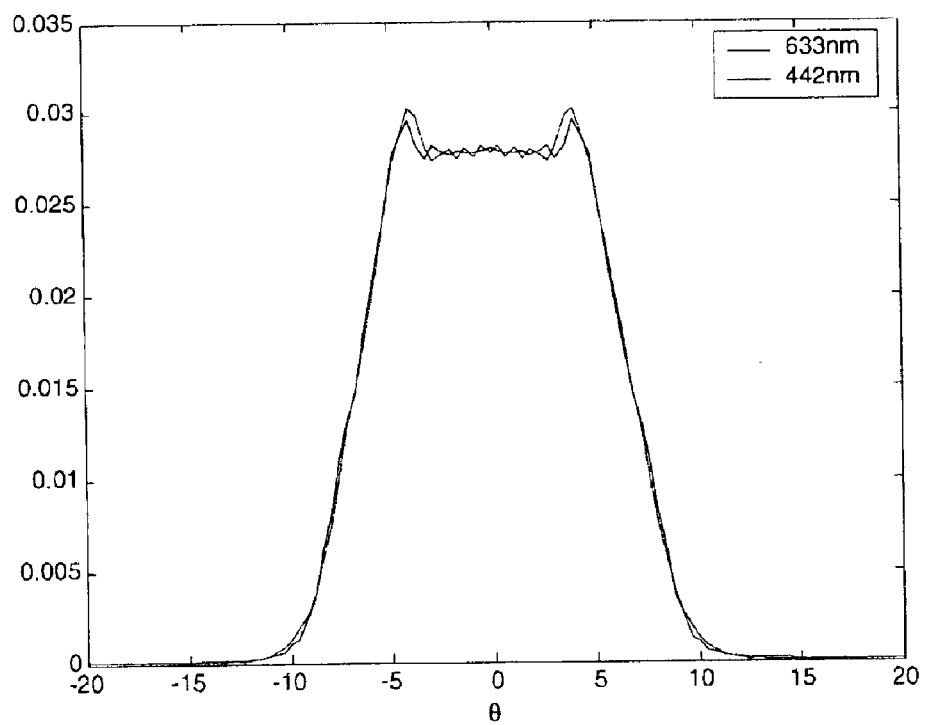
FIG. 4 is a scatter pattern due to a random array of parabolic microlenses at two distinct values of wavelength. The probability distribution describing the variation of radii of curvature is uniform.

As a second example, consider an array with diameter D=100 microns and focal length f=430 microns. The selected parameter for randomization is the divergence angle with uniform PDF in the range 5–10 degrees. The scatter pattern in shown in FIG. 4. Note the homogenization of the scatter pattern as well as the distinct intensity profile, with broader fall-off towards larger angles.

Figure 5:
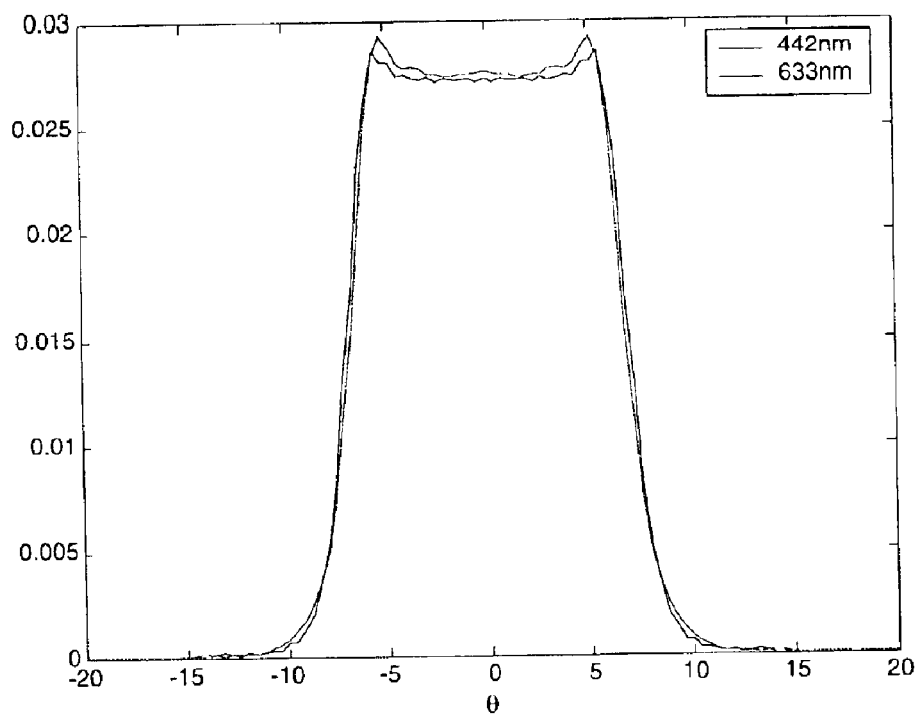
FIG. 5 is a scatter pattern due to a random array of parabolic microlenses at two distinct values of wavelength. The probability distribution describing the variation of radii of curvature is a negative exponential.

As a third example, consider an array with diameter D=100 microns and focal length f=573 microns. The selected parameter for randomization is the divergence angle with Gaussian PDF in the range 5–10 degrees. The scatter pattern in shown in FIG. 5. Note the homogenization of the scatter pattern compared with the nearly regular array of FIG. 3 and comparable intensity fall-off towards larger angles.

Figure 6:
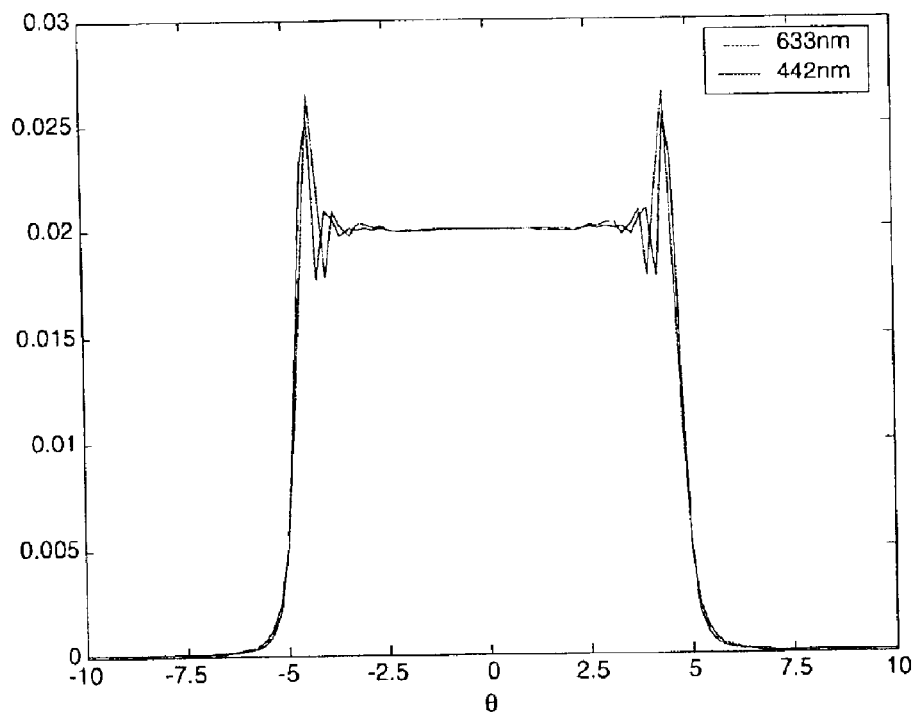
FIG. 6 is a scatter pattern due to a random array of parabolic microlenses at two distinct values of wavelength. Radii of curvature and diameters vary such that the focal location is fixed.

As a fourth example, consider an array with a fixed focal length but varying diameter and maximum sag such that the target divergence angle is 5 degrees. The randomization in maximum obeys a uniform PDF in the range 5–10 microns. The scatter pattern in shown in FIG. 6. This particular example achieves remarkable homogenization within a ±3.5-degree range with a sharp intensity cut-off towards large angles.

The above illustrations of the methods of the present invention, although focused on specific examples, are not restrictive and apply to arbitrary microlens profiles whose defining parameters can be subject, one at a time or simultaneously, to an arbitrary probability distribution function. With this process, the microlens array 22 is randomized to allow intensity shaping and homogenization of the scatter pattern. Similar processes can be applied to microlens arrays 22 with general sag profiles.

(ii) Microlens Boundary

The microlens boundary determines the shape of the area that concentrates most of the light scattered by the array at a location away from the array. For instance, a microlens with square aperture scatters light over a square region in the far field. Depending on the power of the lens, the actual scatter area can be a distorted square. For instance, if power is distinct along two perpendicular directions, the scatter shape will be rectangular. As a rule, rays propagating along a direction of increased power are distributed over a larger area away from the array. This rule provides the means to determine the amount of distortion associated with a microlens array of arbitrary boundary and variable power along different directions.

The way light is distributed within the scatter area (intensity profile) is determined by the microlens sag profile within its boundaries and its randomization, as seen previously. For instance, to attain uniform light distribution, one must make sure that on average the same number of rays are directed towards any scatter region in the far field.

Figure 7A:
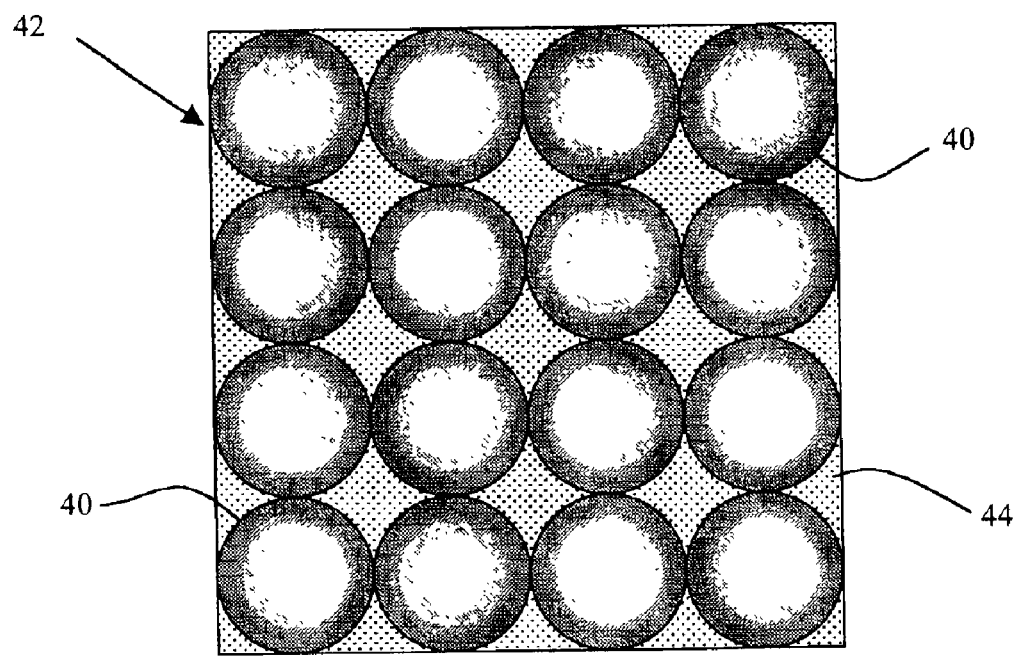
FIGS. 7A and 7B are illustrations of regular tiling of the plane with circles.
Figure 7B:
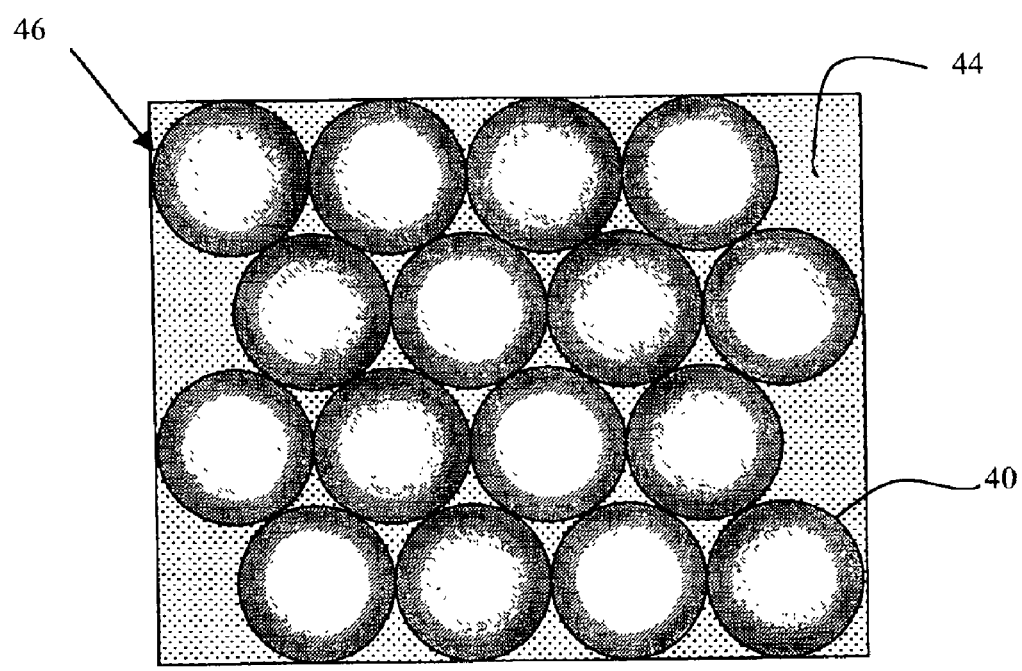

To avoid any beam propagation straight through the substrate its whole surface area must be occupied by regions that possess focusing power, either a microlens or a section of a microlens. If the microlens boundary allows complete coverage of the substrate surface area, the scatter area naturally exhibits the symmetry of the microlens boundaries (again accounting for possible distortions due to varying power): square microlenses scatter into square areas, rectangular microlenses scatter into rectangular areas, and hexagonal microlenses scatter into hexagonal areas. It is less obvious, however, that shapes that cannot completely fill the surface area of the substrate (non-filling shapes) such as circles can be attained in the scatter pattern. Examples of coverage of a substrate surface 44 with microlens boundary circles 40 are illustrated in FIGS. 7A and 7B. Note that several other shapes, in addition to circles, are required to completely cover the surface 44.

In general, it is necessary to use two or more different shapes to cover the array surface 44 of a substrate. FIGS. 7A and 7B illustrate cases of circle coverage by regular arrays 42 and 46, where at least two distinct shapes are required to cover the surface 44. Random packing of the boundary circles 40 is also possible but requires a larger number of distinct shapes to cover the surface 44. Similar reasoning can be extended to any shape, and it seems clear that coverage of the substrate surface 44 cannot be attained with a single microlens boundary shape except in a few special cases such as squares, rectangles, and hexagons.

The present invention provides the means to produce arbitrary distribution of luminous energy within an arbitrary scatter shape, independently of whether a single microlens shape covers the substrate surface 44 or not. In particular, the present invention provides a microlens array that can distribute luminous energy within an arbitrary scatter shape. To illustrate the method, the means to generate uniform circular scatter is described; but a similar process can be used for any other shape or different intensity profile.

Figure 8:
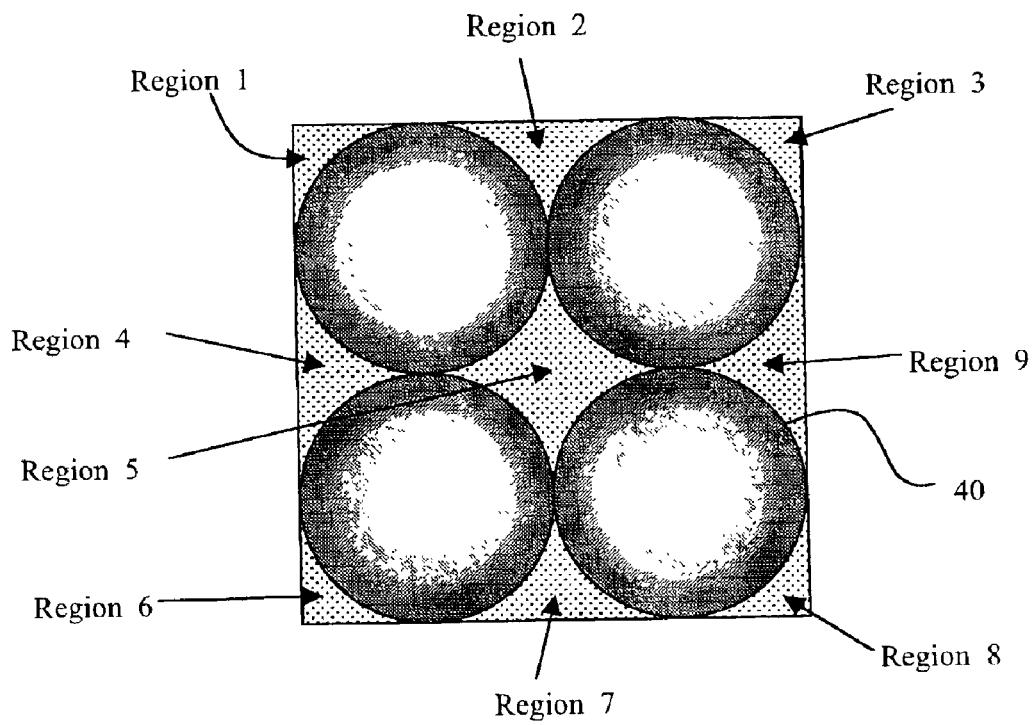
FIG. 8 is a unit cell of a square tiling of the plane indicating nine non-conforming regions.
Figure 13:
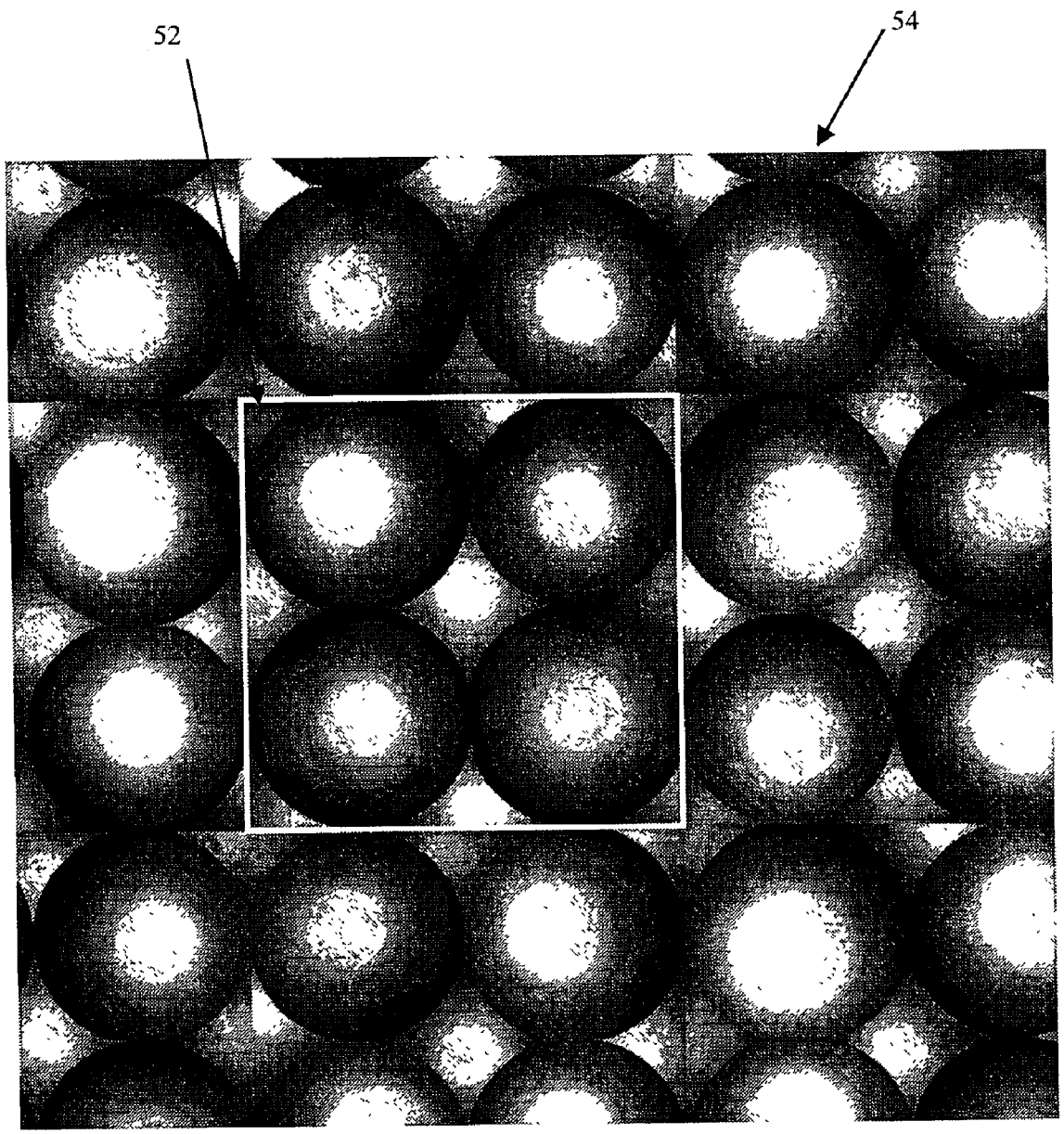
FIG. 13 is an illustration of the microlens array that projects a circle with the unit cell circled by the white boundary.

Consider the case where the circular boundaries 40 of microlenses are located on a regular square grid referenced to the global reference frame (x,y,z) such as shown in FIG. 13. Now divide the plane into a multitude of cells that completely cover the substrate surface, such as an imaginary array of square cells 52. Each square cell 52 contains both boundary circles and other shapes. According to the invention, each such cell 52 can be addressed individually in such a way that, once the whole process is carried out, every point of the substrate surface 44 will have been assigned to a microlens sag profile. There is no single way to select the cells 52, and any approach is valid as long as the whole substrate surface 44 is considered. For boundary circles on a regular grid, a possible cell choice (i.e., the square cell 52) is illustrated by FIG. 8. Within a given cell 52, there are areas with the desired scatter shape (the circles 52) and other areas labeled Regions 1 through 8 that do not conform to the desired shape (they are not circles).

A "conforming boundary" is defined as a microlens boundary that naturally scatters light into a given shape. For instance, a square boundary scatters into a square area, so therefore the square is the conforming shape for square scatter; a circular boundary scatters into a circular area, so therefore the circle is the conforming shape for circular scatter; and similarly for any other shape. If a boundary shape does not naturally produce the desired shape, it is called a "non-conforming boundary". Again, referring to FIG. 8, since a circular scatter shape is desired, the circle is the conforming shape. However, the boundary circles 40 cannot completely cover the surface 44 of the substrate. Therefore, there will be other boundary shapes on the substrate surface 44 other than circles (e.g., the Regions 1 through 8). These Regions do not naturally scatter light into circular scatter areas and are, therefore, considered non-conforming areas.

Figure 9:
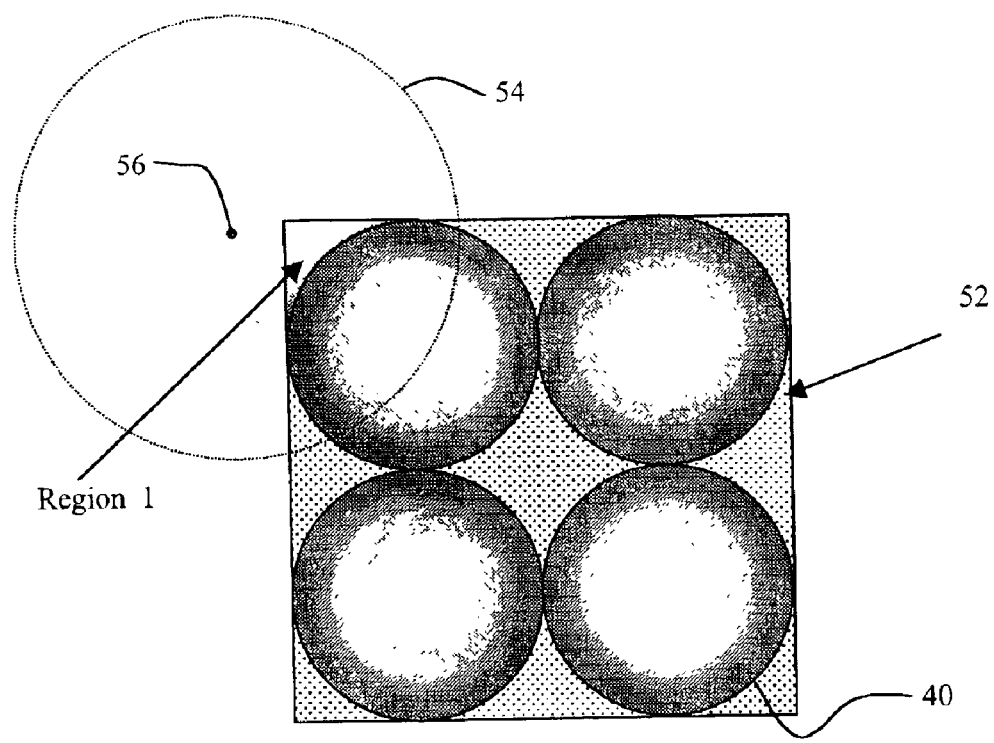
FIG. 9 is an illustration of the means to define the sag of a non-conforming region in the case of circular apertures.
Figure 10A:
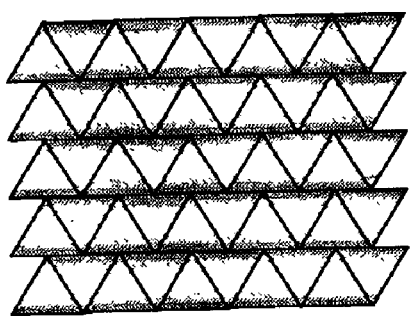
FIGS. 10A–10D illustrate complete coverage of the array plane with different shapes.
Figure 10B:
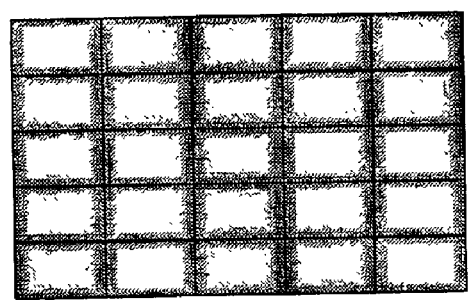
Figure 10C:
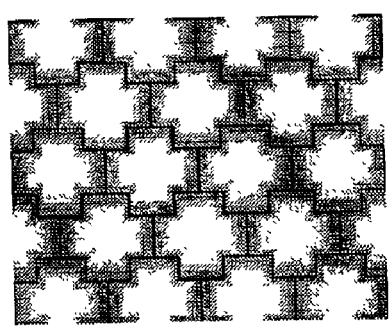
Figure 10D:
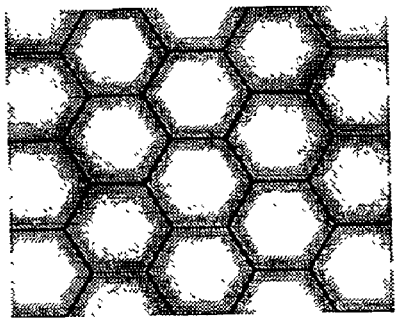
Figure 11A:
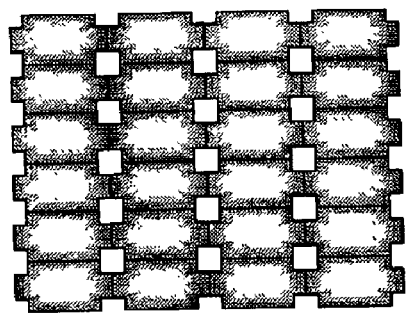
FIGS. 11A–11D illustrate shapes that cannot provide complete coverage of the array plane.
Figure 11B:
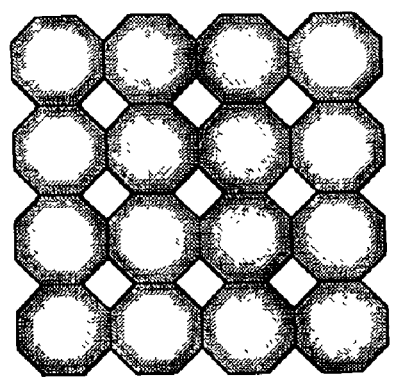
Figure 11C:
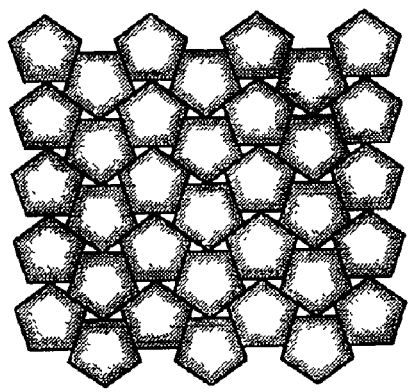
Figure 11D:
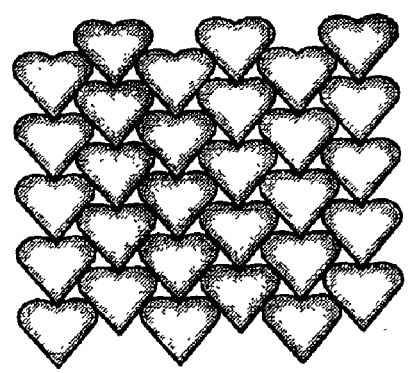

The issue with non-conforming areas resides on how to define a sag function that still provides the desired energy distribution scatter, given that their shapes do not naturally produce the desired scatter shape. The invention addresses the definition of the sag profile in the non-conforming areas in the following way. With reference to FIGS. 8 and 9, start the process by choosing a certain non-conforming region to work with, such as Region 1. Now select a random center point 56 that locates an imaginary microlens unit with a conforming boundary shape 54 (a circle in the present case). The center point 56 and diameter of the imaginary circle 54 must be such that the circle 54 completely covers the chosen Region 1. The sag profile must also be such that the resulting divergence angles direct luminous energy towards the desired scatter area away from the array. The final step involves retaining only the section of the sag profile from the imaginary circular microlens that overlaps with Region 1. The same process is then repeated for all the other non-conforming Regions 2 through 8.

Other examples of filling and non-filling shapes are illustrated by FIGS. 10A–D and 11A–D, respectively. For any of these boundary shapes or any other shapes, a process analogous to the one applied to circular microlenses above can be applied to define the sag function in non-conforming regions. The intensity uniformity (or other required intensity distribution) is achieved by the randomization process of random centering and sizing of the imaginary boundary lens element, whose portion will define the sag in the non-conforming area. When a large number of elements are illuminated by the input beam, the array effectively behaves as if the plane were completely filled with the appropriate boundary, and the scatter pattern assumes the desired shape. This fact is demonstrated by an experimental result for the case of circular scatter.

Figure 12A:
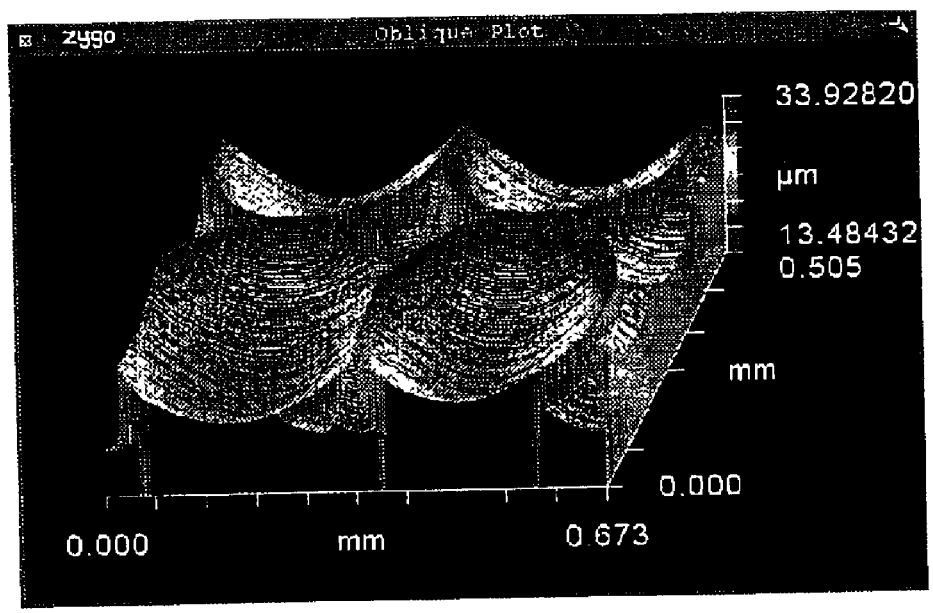
FIGS. 12A and 12B depict measured profiles of a random microlens array that projects a circle.
Figure 12B:
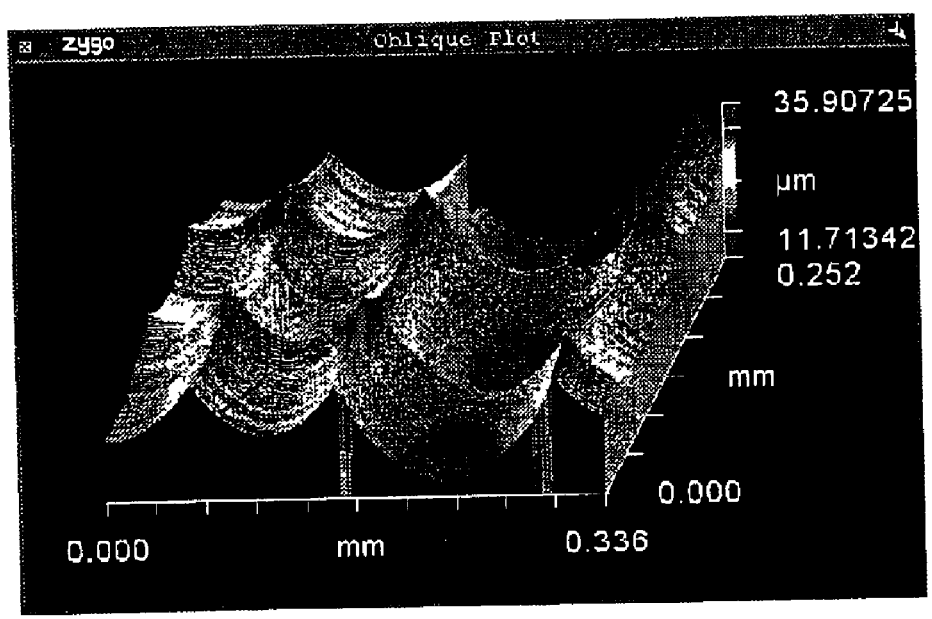

A microlens array was generated according to the above method and lens profile described by $$(i) \quad s(x, y) = \frac{(x - x_0)^2 + (y - y_0)^2}{2R} \quad (7)$$

where (x,y) denotes the Cartesian coordinates at the local coordinate frame of a given microlens, $(x_0, y_0)$ denotes the center of the microlens, and R is the radius of curvature. The lenses are arranged with circular boundaries on a square grid, similar to FIG. 7A. For maximum efficiency and to allow 100% filling factor, the microlenses were fabricated in accordance with the teachings of U.S. Pat. application Ser. No. 09/918,257, filed on Jul. 30, 2001, in the names of Geoffrey B. Gretton, G. Michael Morris, and Tasso R. M. Sales, and entitled "Microlens Arrays Having High Focusing Efficiency", which is incorporated herein by reference. Three dimensional plots of the resulting surface profiles are shown on FIG. 12, as measured by a white light interferometer (Zygo NewView 5000). An illustration of the theoretical microlens array is shown in FIG. 13, with a white outline indicating a typical cell 52 where both conforming and non-conforming regions can be identified, as indicated in FIG. 9. The microlens array 54 is characterized by the following parameters:

Operating wavelength: 193 nm

Diameter of conforming circular microlenses: 300 microns

Divergence angle (full-width at half-maximum): 4.8 degrees

Index of refraction: 1.56

The radii of curvature are selected randomly with uniform PDF so that the divergence angle for the sag profile given by Equation (3) is in the range 4.8°±0.5°. The center values $(x_0, y_0)$ are also chosen randomly with uniform PDF.

The resulting scatter pattern is imaged in FIG. 14A and plotted in FIG. 14B as measured with a coherent input beam with wavelength 633 nm and diameter 5 mm. Note the uniformity of the intensity profile as well as the absence of zero order or image artifacts, even with the difference in design and operating wavelength. In fact, a characteristic feature of random microlens homogenizers is their broad-band capabilities.

Other examples of scatter patterns are shown in FIGS. 15A through 17B for square, rectangular, and annular patterns, respectively. Design parameters are indicated also on the figures. For the square and annular patterns, the sag profile is described by Equation (7). For the annular pattern, the sag profile function takes the following form:

$$s(x, y) = \frac{c[(x - x_0)^2 + (y - y_0)^2]}{1 + \{-(\kappa + 1)c^2[(x - x_0)^2 + (y - y_0)^2]\}^{1/2}} \quad (8)$$

where c represents the radius of curvature and k is the conic constant. The curvature and conic constant are selected randomly with uniform PDF so that the divergence angle is in the range 5°±0.5°. The center values $(x_0, y_0)$ are also chosen randomly with uniform PDF.

The previously discussed intensity plots illustrate some of the beam-shaping capabilities of the random microlens array. The input beam is Gaussian; but the output beam can be shaped in a wide variety of different ways from a flattened Gaussian profile, as in the case of the circular diffusion pattern, to flat, square, and rectangular.

Again, the above illustrations of the methods of the present invention, although focused on specific examples, are not restrictive and apply to microlens boundary shapes and scatter of very general form. Similar processes, as described above, can be applied to general microlens arrays.

(iii) Spatial Distribution

The other component of relevance in the definition of the microlens array is the relative spatial distribution of microlenses. Given a certain microlens boundary, there is always a packing configuration of the conforming shape that provides maximum coverage of the substrate and leaves some (minimum) area of non-conforming boundaries. Such coverage strategy generally presents a regular, periodic nature. Two examples of coverage with circles are shown in FIGS. 7A and 7B with the latter arrangement providing maximum coverage with the conforming shape. In both cases, there is a repeatable pattern of shapes, both conformal and non-conformal.

In some cases, the presence of a regular array may be acceptable; but in other cases, such as for projection screens, the regular pattern of structures can lead to fringing effects such as moiré or aliasing. In such cases, it is preferable to arrange the microstructures in the array on a non-periodic fashion. It is not obvious, however, how to cover the plane of the substrate randomly with the desired conforming shapes and still maintain the desired scatter shape and intensity distribution, given that a random arrangement necessarily leads to an increased area of non-conformal shapes. The present invention provides the means to solve this problem by introducing methods that generate the desired scatter shape and intensity distribution with a random arrangement of conformal shapes.

Figure 19A:
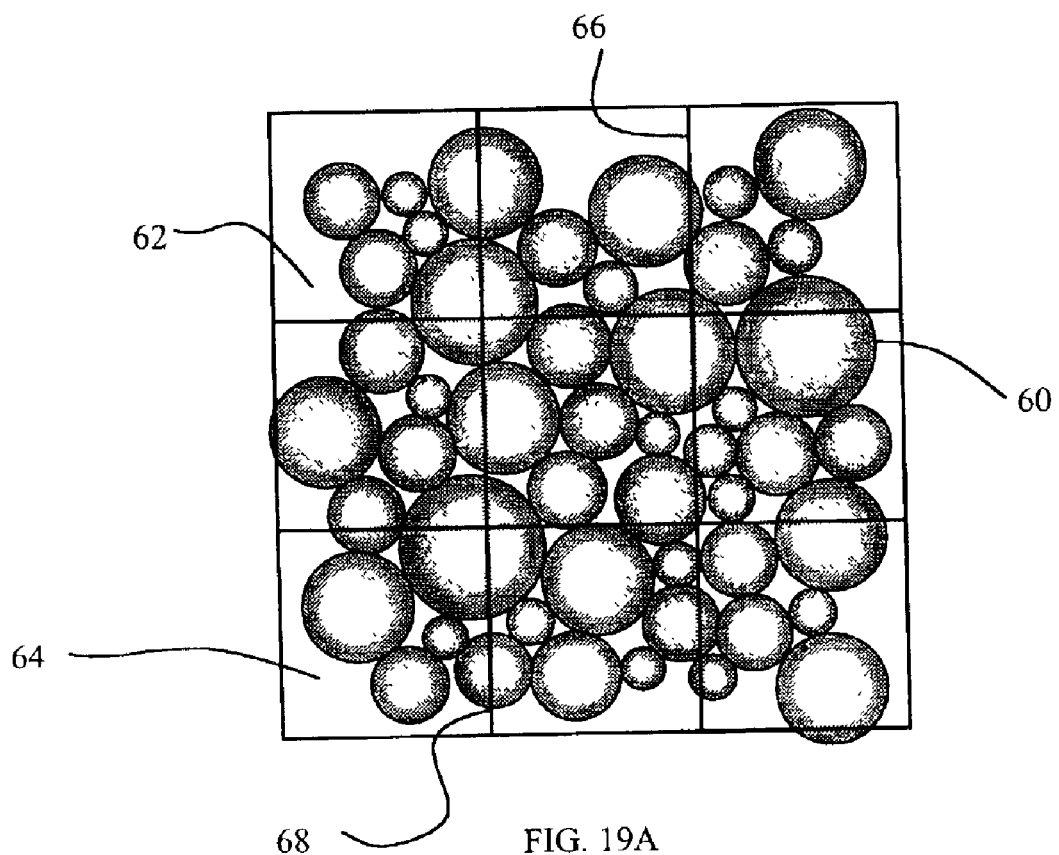
Figure 19B:
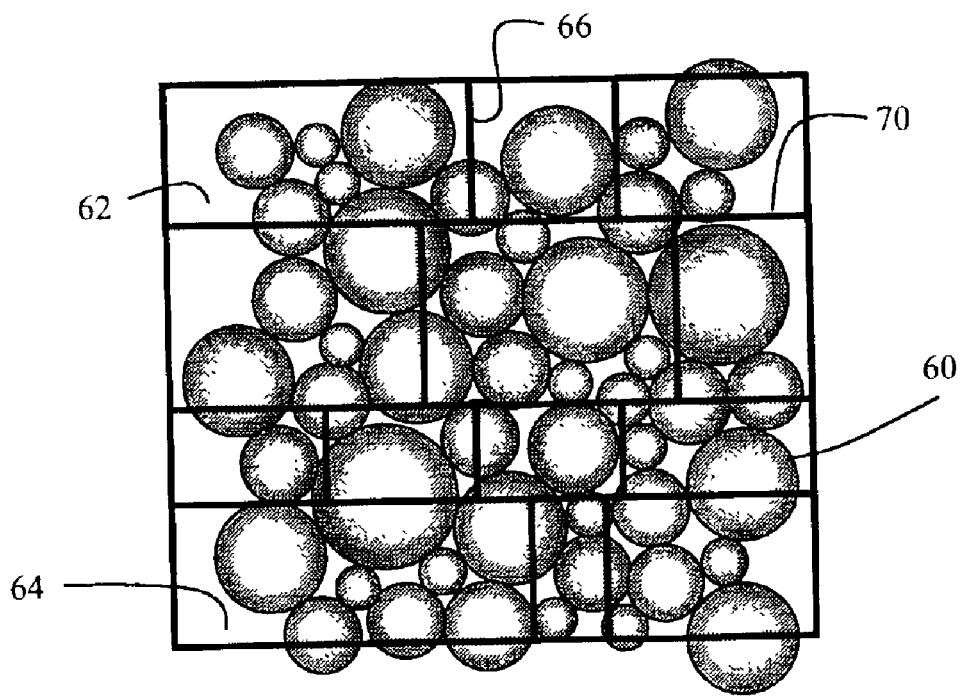

For illustrative purposes, consider a circular scatter pattern for explanation of the idea behind the method. A possible random packing configuration of circles is illustrated in FIG. 18. The diameter of each boundary circle 60 varies according to some PDF, which is typically uniform but can generally assume an arbitrary form. The center of each boundary circle 60 is also randomly distributed on the substrate surface 64 under the constraint that only perimeter intersections are allowed. To define the sag on non-conforming regions 62, an imaginary grid 66 of shapes is constructed that completely covers the plane, which typically assumes the form of squares or rectangles, as illustrated in FIGS. 19A and 19B. Each imaginary tiling section 68 or 70 is addressed using a similar process to that described for the regular arrangement of circles, illustrated in FIG. 9. That is, for each non-conforming region 62 within a given tile 68 or 70, an imaginary circle is centered in such a way that it intersects the non-conforming area 62 under consideration. The imaginary circle presents a diameter and sag that scatters light within the desired scatter area away from the array. The section of the sag of the imaginary circle that intersects the non-conforming area 62 is retained. When this process is repeated over a large number of non-conforming areas 62, the desired scatter shape and intensity profile are obtained. The same process described for the boundary circles 60 can be applied for any other boundary shapes randomly arranged on the substrate surface 64.

Other, more simplified approaches to randomize the spatial distribution are also possible. They exploit a discovery that the conforming shapes (e.g., 60) need to be preserved only on average as they cover the plane. What this means is that only sections of the conforming shapes are necessary to cover the plane of the substrate as long as, on average, all sections of the conforming shape are employed. An example is provided to illustrate this idea, again using circles as the conforming shape. First, imaginary tiling is applied to the substrate plane (the plane of FIG. 20) with squares 72 of a specified size. Each of the squares 72 is then divided into four rectangular sections 74A–D of varying sizes, as illustrated on FIG. 20. Within each rectangular section 74A–D of a given square 72, a conformal shape is defined with a diameter that is equal to the largest dimension of the rectangular section 74A–D. This process is repeated for each rectangular section 74A–D. The sag of non-conformal areas is then defined by a similar process as that described in connection with FIG. 9. An example of such an array is illustrated by FIG. 21. A tiling cell 72 showing the conformal areas is indicated. For any other possible arrangement of microlens boundaries, a similar process applies, keeping in mind that conforming shapes must be preserved only on average.

Figure 22A:
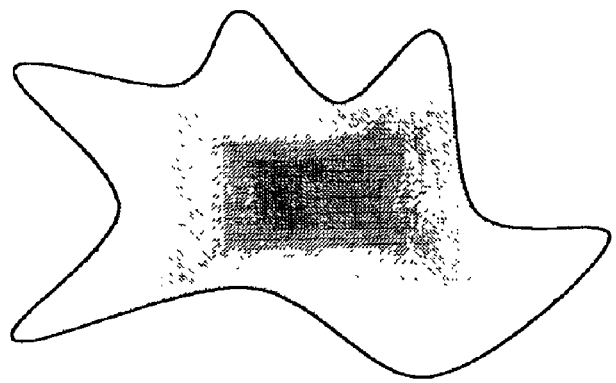
Figure 22B:
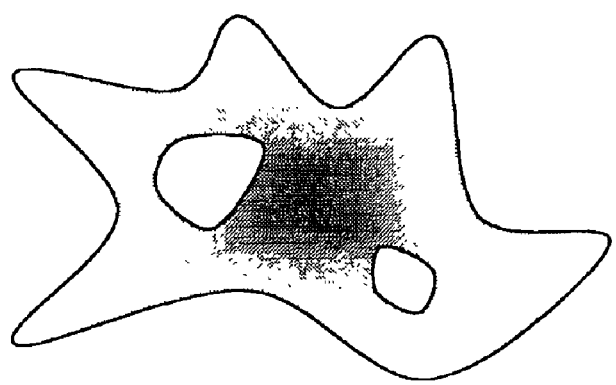
Figure 22C:
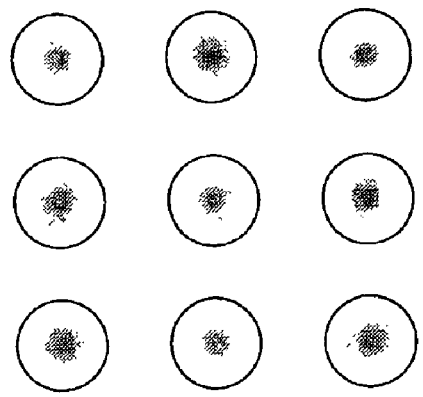
Figure 22D:
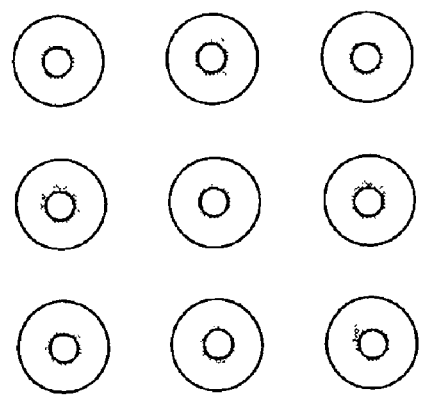

Up to this point, random microlens arrays have been considered that scatter light into simply connected regions, that is, regions that do not have "holes" in them, as exemplified by the shape in FIG. 22A. A remarkable finding of the present invention provides the means to generate scatter patterns that present multiply-connected shapes (with holes in it, as shown in FIG. 22B), sets of isolated simply-connected shapes (FIG. 22C), or sets of isolated multiply-connected shapes (FIG. 22D).

The means to generate multiply-connected scatter patterns is described below. For this purpose, the present invention introduces a novel generalization of the sag function of a given lens by adding an angular component that is proportional to the polar angle $\theta$, defined in the local reference frame of the microlens. In its simplest form, the function $\Theta$ in Equation (1) is defined as follows $$\Theta(\theta) = p\theta \frac{\lambda}{2\pi(n_m - n_0)} \qquad (9)$$

where p is referred to as the charge number. A surface profile defined according to the above equation is also known as a phase singularity, because at $\theta=0$ the wavefront phase is undefined, causing the field to vanish. Consequently, the presence of a phase singularity in the definition of a microlens sag function guarantees the presence of a null in the scatter pattern. An illustration of such an angular sag function is seen in FIG. 23. To achieve general beam shaping capabilities, the sag of a given microlens must be defined in the following form:

$$s(x, y) = f(x, y) + \sum_k p_k \Theta(\theta - \theta_k) \qquad (10)$$

where f(x,y) denotes the Cartesian component of the sag function, similar to that shown on Equation (3) and $\Theta(\theta-\theta_k)$ denotes the angular component to the sag with specified origin $\theta_k$. The coefficient $p_k$ gives the strength of each phase singularity.

As an example, consider the generation of a quadrupole pattern where the input beam is transformed into four separate beams away from the array, as indicated on FIG. 24A. The shape of the scatter pattern on each individual quadrant of the quadrupole can assume an arbitrary form. Examples for circular and rectangular quadrupoles are shown in FIGS. 24B and 24C, respectively. The sag function assumes the form given by Equation (10). A top-view illustration of a section of the array is depicted in FIG. 25, where the microlens boundary is rectangular. This element was fabricated and the scatter pattern is shown on FIG. 26, under illumination with wavelength equal to 633 nm. The calculated theoretical scatter profile is depicted in FIG. 27.

To further exemplify the use of the angular component to the sag function, another example of a microlens array is provided that generates the target scatter pattern indicated on FIG. 28. Such scatter distribution cannot be easily implemented with conventional microlens arrays but offers little difficulty with the angular component to the sag. The actual sag function is given by $$s(x, y) = \frac{(x - x_0)^2 + (y - y_0)^2}{2R} + \Theta(\theta) \qquad (11)$$

where the angular component involves six distinct functional components defined as follows:

$$\Theta(\theta) = \arctan\left(\frac{y - y_0 - D/4}{x - x_0 - D/4}\right) + \arctan\left(\frac{x + x_0 - D/4}{y - y_0 - D/4}\right) + \qquad (12)$$

$$\arctan\left(\frac{y - y_0}{x - x_0}\right) + \arctan\left(\frac{x + x_0}{y - y_0}\right) +$$

$$\arctan\left(\frac{y - y_0 + D/4}{x - x_0 + D/4}\right) + \arctan\left(\frac{x + x_0 + D/4}{y - y_0 + D/4}\right)$$

where D, the size of the square microlens boundary, equals 200 microns. The sag is illustrated in FIG. 29. The simulated scatter pattern away from the array is shown in FIG. 30. The simulated scatter assumes the material to have an index 1.6 at wavelength 193 nm, full divergence angle equal to 4 degrees.

The above examples serve to illustrate the beam-shaping capabilities achieved by combining conventional microlens sag profiles with angular components (phase singularities). In general, the careful placement of phase singularities in combination with a random microlens array provides the means to generate arbitrary multiply-connected scatter shapes.

The addition of an angular component to the sag function allows the generation of multiply-connected scatter patterns. There are, however, other methods to generate multiply-connected scatter patterns as now described by again using the example of the quadrupole, with each quadrant being composed of separate circles. The starting point is to consider an array with circular apertures that generates a scatter pattern that would normally cover an area containing the quadrupole, as illustrated on FIG. 31. Next, sections of each microlens in the large array are isolated that produce the conforming shapes for the quadrupole, indicated on FIG. 31 by the four selected areas within each circular microlens unit of the large array. By themselves, these four areas produce the quadrupole pattern and, therefore, constitute the conforming shapes. The remaining area of each microlens cell unit becomes the non-conforming area, which needs to have its sag defined to produce the desired scatter shape.

FIGS. 32A and 32B illustrate how this is done where one cell unit has been isolated. Only the conformal shapes are retained as indicated on FIG. 32B, and the remaining non-conformal area is divided into several regions, as indicated. The particular form of selecting regions is not important; and in this particular example, four regions have been associated with each quadrant of the quadrupole conforming shapes. Only four regions are indicated on FIG. 32B for simplicity. In the referenced procedure, a sag function is assigned only to Region 1 but a similar process should be applied to all remaining 15 regions of the cell. Similar to methods described previously to assign sag to non-conforming regions, an imaginary set of conforming shapes is produced and randomly located but in such a way that some portion of it covers completely the region under consideration, in this case Region 1, as shown on FIG. 33. The profile and depth of the imaginary set are such that light rays are diverted to the desired scatter region. The intersection of the imaginary sag with Region 1 defines its sag. The same process is then repeated to all non-conforming regions in the cell and similarly to the whole array.

The above process has been experimentally demonstrated by fabricating a microlens array that generates a quadrupole pattern with circular components that diverges at about 5 degrees off-center. An illustration of the microlens array 82 is indicated on FIG. 34. The white outline indicates the cell unit 84 containing the 4 conforming shapes and all 16 non-conforming shapes. The resulting measured scatter pattern is shown in FIG. 35 for incident wavelength 633 nm, and the theoretical prediction is shown on FIG. 36.

The above process illustrated for the circle can be applied similarly to any required shape or distribution in the far field. The process is generally to identify the set of conforming shapes, define their sag, identify the non-conforming shapes, create the imaginary conforming shape that produces the desired divergence angles and intensity distribution, center the imaginary conforming shape randomly in such a way that some portion of it intersects the non-conforming shape under consideration, assign the shape of the region under consideration by the imaginary section that intersects it, and repeat the process to all non-conforming shapes in the array. The method can be easily extended to more complex scatter patterns. FIG. 37 shows a microlens array that scatters the input beam into an array of 6×6 spatially isolated beams.

A further example of a complex scatter pattern illustrates that the conforming shapes can constitute a set of distinct shapes. For this particular example, the scatter presents three distinct shapes (circular, square, and triangular). FIGS. 38A–38C show a cell 88 with the desired conforming shapes 90, 92, and 94 within a larger imaginary circular lens 96 and a possible configuration of non-conforming shapes 98, 100, and 102. The sag assignment to the non-conforming shape 102 is also indicated within Region 1. A similar process is repeated for all non-conforming shapes in the cell and then to all cells covering the array.

A further method to control light distribution over the scatter area away from the array uses tilted microlens units, as illustrated on FIG. 39. Tilt can be introduced by modifying the sag function $s_{tilt}(x,y)$ as follows:

$$s_{tilt}(x,y) = s(x,y) + (x-x_0)\cos\phi_x + (y-y_0)\cos\phi_y \qquad (13)$$

where s(x,y) denotes the sag function without tilt and $\phi_x$ and $\phi_y$ indicate tilt angles along x and y, respectively. Similar to the previous descriptions, tilt can be randomized and assigned to a fraction or all of the microlenses or portions thereof, according to whether the microlens boundary represents a conforming or non-conforming shape. Advantages of allowing microlens tilt include further control of focus distribution for each microlens, which directly affects the scatter pattern away from the array, and further control of ray direction, which directly affects the scattered intensity profile.

To add further design flexibility to random microlens arrays, another aspect of the invention considers the configuration where two random microlens arrays 106 and 108 are placed on either side of a substrate 104, as indicated in FIG. 40. Another possibility is to combine the random microlens array on one side with a distinct diffusing element on the opposite side, such as ground diffusers, roughened surfaces, holographically exposed patterns, diffractive patterns, gratings, polarizing surfaces, lenses, or lens arrays diffractive elements, as illustrated in FIG. 41. For substrates with structures on both sides, there may be a preferable side of incidence for optimum performance. This approach provides an increased number of design parameters. It also provides the means to enhance the homogenization properties of the array since a sequence of diffusing elements generally provides smoother intensity variations than a single diffuser element, although it also tends to reduce resolution. In some cases, the two-sided approach can be advantageous in terms of fabrication, if an array on a single surface presents tight tolerances or difficult relief profile, by providing additional design degrees of freedom that can be utilized to generate more manufacturable microlens arrays.

An important consideration of the microlens units used in the present invention is the maximum sag or depth. In some circumstances, such as fabrication or packaging, it is desirable to have an array of microlenses that do not exceed a certain depth. If the array generated by adopting the teachings previously described has a total depth that exceeds a maximum acceptable value, there may be a need to modify the design and reduce the depth. A simple approach to achieve this involves changing the size of microlens units, such as reducing the diameter. If this or similar approaches are not possible or do not yield the desired depth reduction, another depth reduction method is required. The invention provides the means to generate an equivalent array with depth equal to or below the maximum acceptable value as described next.

The basic principle behind this alternative depth reduction method is to convert some or all microlenses in the array into equivalent diffractive microlenses. The basic principle of the diffractive microlens is simple to understand, as follows. The phase delay experienced by a given ray through a refractive element is typically many multiples of $2\pi$. Because of the oscillatory nature of the electromagnetic radiation, the state of a ray is the same after it goes through a $2\pi$ cycle as after it traverses $2\pi M$ units of $2\pi$, with M an arbitrary integer. The diffractive lens can be seen as a refractive one from which the unnecessary $2\pi$ phase delays have been removed. With this process, one is left with a lens that behaves exactly as a refractive one (at a specific wavelength) but is considerably thinner. The process is illustrated on FIG. 42. The physical thickness equivalent to a $2\pi$ phase delay equals $\lambda/\Delta n$, where $\lambda$ is the wavelength and $\Delta n$ is the index variation. Therefore, the thinnest possible diffractive microlens has a thickness $\lambda/\Delta n$.

A general method to convert each refractive microlens element 110 in the array to an equivalent diffractive element 112 follows. Let $\phi_r$ define the phase delay associated with the refractive microlens 110 designed according to the teachings of the present invention, and $\phi_d$ is the phase delay due to the equivalent diffractive microlens 112. A so-called diffractive operator $\Delta_M$ acting on the refractive phase results in a diffractive phase so that $\phi_d = \Delta_M\{\phi_r\}$. Therefore, the action of the diffractive operator at a given point of the refractive microlens phase is to remove $2\pi M$ units of phase delay. Given the sag function s(x,y) for the refractive lens 110, the first step is to convert to phase delay, by means of the following relation $$\phi_r = \frac{2\pi}{\lambda}\Delta n s(x, y) \quad (14)$$

where $\Delta n$ denotes the variation of index of refraction between incident and transmission media and $\lambda$ is a value of wavelength randomly chosen between $\lambda_{min}$ and $\lambda_{max}$, which designate the minimum and maximum values of wavelength in the spectrum of operation, respectively.

Depending on the fabrication capabilities and performance requirements, it is then necessary to define a range of values for M ($M_{min}$ and $M_{max}$) from which to define specifically the diffractive operator $\Delta_M$. After such a selection for parameter M has been made, preferably in a random manner, the diffractive phase delay can be calculated by applying the diffractive operator, as follows $$\phi_d = D_M\{\phi_r\} = D_M\left\{\frac{2\pi}{\lambda}\Delta n s(x, y)\right\} \quad (15)$$

Once the diffractive phase delay is determined, the physical sag for the diffractive equivalent microlens $s_d(x,y)$ can be calculated from:

$$s_d(x, y) = \frac{\phi_d}{2\pi}\frac{\lambda}{\Delta n} = \frac{\lambda}{2\pi\Delta n}D_M\{\phi_r\} \quad (16)$$

Note that, since the maximum value of $\Delta_M\{\phi_r\}$ equals $2\pi M$, the maximum value for $s_d$ equals $\lambda M/\Delta n$. As a comparative illustration between the refractive and diffractive microlens depth solutions, Table I shows the required refractive maximum sag together with diffractive designs that keep the maximum sag below 20 microns. The corresponding value of M and the minimum zone spacing for the diffractive microlens are also indicated. The comparison applies to parabolic surface profiles with a diameter equal to 100 microns at wavelength 633 nm. As seen on Table I, the diffractive solution allows designs of low sag even for very large divergence angles. As one might expect, the minimum feature gets considerably smaller towards large angles.

TABLE I

Maximum lens sag ($sag_{max}$) for refractive and diffractive soutions that spread light over divergence angle $\Delta\theta$. Diffractive design is such that maximum sag remains below 20 microns. The microlenses are assumed parabolic with a circular shape of diameter 100 microns and a design wavelength 633 nm.

| $\Delta\theta$ | $sag_{max}$ (refractive) | $\Delta r_{min}$ | M | $sag_{max}$ (diffractive) |
|---|---|---|---|---|
| 60 | 17.0 | 10.0 | 8.2 | 11.4 |
| 80 | 26.1 | 10.0 | 11.9 | 16.5 |
| 100 | 40.0 | 8.0 | 13.9 | 19.2 |
| 120 | 63.1 | 5.5 | 14.2 | 19.7 |
| 140 | 103.3 | 3.4 | 14.3 | 19.7 |
| 160 | 163.5 | 1.6 | 14.1 | 19.5 |

It will be apparent to those skilled in the art that various modifications and variations can be made to the present invention without departing from the spirit and scope of the invention.

What is claimed is:

1. An optical device for shaping an optical beam according to a prescribed intensity profile within a desired far-field scatter pattern comprising:

an optical substrate;

an array of microlenses distributed on the substrate;

each microlens being defined within the array by values for a set of parameters that are generally different from values for the same set of parameters that define other microlenses of the array;

the parameters including a sag profile corresponding to a surface shape of the microlenses, a boundary profile corresponding to a boundary of the microlenses, and a spatial distribution corresponding to the relative position of the microlenses within the array;

the sag profile being varied between the microlenses of the array to homogenize the intensity profile of the optical beam;

the boundary profile being varied between the microlenses within an irregular spatial distribution to apply the prescribed intensity profile within the desired far-field scatter pattern;

the sag profile being varied between the microlenses of the array according to a probability distribution function; and the sag profile being defined by one or more random variables that satisfy the probability distribution function within an allowed range.

2. The device of claim 1 which at least some of the plurality of the random variables of the sag profile are associated with different probability distribution functions.

3. The device of claim 1 in which the random variables include radii of curvature, conic constants, and aspheric coefficients of a sag function mathematically representing the sag profile.

4. The device of claim 1 in which the boundary profile of at least some of the microlenses defines a conforming boundary that scatters evenly powered portions of the optical beam into a matching shaped far-field pattern.

5. The device of claim 4 in which the conforming boundary has a polygonal shape.

6. The device of claim 4 in which the conforming boundary has a curved shape.

7. The device of claim 1 in which at least some of the microlenses are diffractive microlenses to reduce a depth dimension with respect to the substrate.

8. An optical device for shaping an optical beam according to a prescribed intensity profile within a desired far-field scatter pattern comprising:

an optical substrate;

an array of microlenses distributed on the substrate;

each microlens being defined within the array by values for a set of parameters that are generally different from values for the same set of parameters that define other microlenses of the array;

the parameters including a sag profile corresponding to a surface shape of the microlenses, a boundary profile corresponding to a boundary of the microlenses, and a spatial distribution corresponding to the relative position of the microlenses within the array;

the sag profile being varied between the microlenses of the array to homogenize the intensity profile of the optical beam;

the boundary profile being varied between the microlenses within an irregular spatial distribution to apply the prescribed intensity profile within the desired far-field scatter pattern;

the boundary profile of at least some of the microlenses defining a conforming boundary that scatters evenly powered portions of the optical beam into a matching shaped far-field pattern; and the boundary profile of other of the microlenses defining a non-conforming boundary that scatters evenly powered portions of the optical beam into a far-field pattern that does not match the shape of the non-conforming boundary.

9. The device of claim 8 in which the non-conforming boundary has a curved shape.

10. The device of claim 8 in which the microlenses with conforming boundaries are arranged in a spatial distribution to minimize remaining intervening areas for the microlenses with non-conforming boundaries.

11. The device of claim 8 in which the microlenses with non-conforming boundaries fill spaces on the substrate in between the microlenses with conforming boundaries.

12. The device of claim 11 in which both the microlenses with conforming boundaries and the microlenses with non-conforming boundaries exhibit focusing power.

13. The device of claim 8 in which the boundary profile of at least one of the microlenses defines a section of a conforming boundary and the boundary profiles of other of the microlenses define other sections of the same conforming boundary.

14. The device of claim 8 in which the microlenses with conforming boundaries have a random arrangement of different conformal boundaries according to a probability distribution function.

15. The device of claim 14 in which the different conformal boundaries randomly vary in size within a limited range.

16. The device of claim 14 in which the far-field scatter pattern of the optical beam is a simply connected region having a shape that matches an average shape of the microlenses with conforming boundaries.

17. An optical device for shaping an optical beam according to a prescribed intensity profile within a desired far-field scatter pattern comprising:

an optical substrate;

an array of microlenses distributed on the substrate;

each microlens being defined within the array by values for a set of parameters that are generally different from values for the same set of parameters that define other microlenses of the array;

the parameters including a sag profile corresponding to a surface shape of the microlenses, a boundary profile corresponding to a boundary of the microlenses, and a spatial distribution corresponding to the relative position of the microlenses within the array;

the sag profile being varied between the microlenses of the array to homogenize the intensity profile of the optical beam;

the boundary profile being varied between the microlenses within an irregular spatial distribution to apply the prescribed intensity profile within the desired far-field scatter pattern; and the sag profile being defined by a sag function containing at least one phase singularity for producing a null in the far-field scatter pattern.

18. The device of claim 17 in which the phase singularity contributes to the generation of the far-field scatter pattern formed as a multiply-connected region.

19. The device of claim 18 in which the microlenses with conforming boundaries are grouped together and spaced apart by microlenses with non-conforming boundaries to produce spatially isolated sections of the optical beam.

20. The device of claim 19 in which the microlenses are arranged to form at least four spatially isolated sections of the optical beam.

21. An optical device for shaping an optical beam according to a prescribed intensity profile within a desired far-field scatter pattern comprising:

an optical substrate;

an array of microlenses distributed on the substrate;

each microlens being defined within the array by values for a set of parameters that are generally different from values for the same set of parameters that define other microlenses of the array;

the parameters including a sag profile corresponding to a surface shape of the microlenses, a boundary profile corresponding to a boundary of the microlenses, and a spatial distribution corresponding to the relative position of the microlenses within the array;

the sag profile being varied between the microlenses of the array to homogenize the intensity profile of the optical beam;

the boundary profile being varied between the microlenses within an irregular spatial distribution to apply the prescribed intensity profile within the desired far-field scatter pattern; and the substrate being a transmissive substrate having opposing first and second sides, the array of microlenses is located on the first side of the substrate, and a diffusing element is located on the second side of the substrate.

22. The device of claim 21 in which the diffusing element is one of a roughened surface, a holographically exposed pattern, a diffractive pattern, a grating, a polarizing surface, a lens, and a lens array.

23. An optical device for homogenizing luminous energy of an illuminating beam within a desired scatter pattern comprising:
a substrate divided into a plurality of sections;
the individual sections being associated with a microlens defined by particular values of a set of parameters;
the set of parameters including a sag profile defining a surface of the individual microlenses, a microlens boundary profile defining a boundary of the individual microlenses, and a spatial distribution locating the individual microlenses on the substrate; and
the values of two or more of the parameters being randomized between the microlenses within allowed ranges according to a probability distribution function to homogenize luminous energy of the illuminating beam within the desired scatter pattern.

24. The device of claim 23 in which the sag profile is randomized according to the probability function to produce a desired scattered intensity pattern of the illuminating beam.

25. The device claim 24 in which the sag profile is defined by random variables that satisfy the probability distribution function within an allowed range.

26. The device of claim 25 in which each of the random variables of the sag profile is associated with a different probability distribution function.

27. The device of claim 26 in which the probability distribution function is a uniform probability distribution function.

28. The device of claim 24 in which the probability distribution function is a Gaussian probability distribution function.

29. The device of claim 23 in which the parameters of the microlenses subject to randomization include microlens diameter, divergence angle, and focal location.

30. The device of claim 23 in which the boundary profile of at least some of the microlenses defines a conforming boundary that scatters evenly powered portions of the illuminating beam into a matching shaped far-field scatter pattern.

31. The device of claim 30 in which the conforming boundary has a polygonal shape.

32. The device of claim 30 in which the conforming boundary has a smooth curved shape.

33. The device of claim 30 in which the boundary profile of other of the microlenses defines a non-conforming boundary that scatters evenly powered portions of the illuminating beam into a far-field pattern that does not match the shape of the non-conforming boundary profile.

34. The device of claim 33 in which the non-conforming boundary has a piecewise curved shape.

35. The device of claim 33 in which the microlenses with non-conforming boundaries fill spaces on the substrate in between the microlenses with conforming boundaries.

36. The device of claim 35 in which both the microlenses with conforming boundaries and the microlenses with non-conforming boundaries exhibit focusing power.

37. The device of claim 33 in which the boundary profile of at least one of the microlenses defines a section of a conforming boundary and the boundary profiles of other of the microlenses define other sections of the same conforming boundary.

38. The device of claim 33 in which the microlenses with conforming boundaries have a random arrangement of different conformal boundaries.

39. The device of claim 38 in which the different conformal boundaries vary in size.

40. The device of claim 23 in which the sag profile is defined by a sag function containing a phase singularity for producing a null in the scatter pattern.

41. The device of claim 40 in which the phase singularity contributes to the generation of multiply-connected scatter shapes within the scatter pattern.

42. The device of claim 33 in which the microlenses with conforming boundaries are grouped together and spaced apart by microlenses with non-conforming boundaries to produce spatially isolated sections of the illuminating beam.

43. The device of claim 42 in which the microlenses are arranged to form at least four spatially isolated sections of the illuminating beam.

44. The device of claim 23 in which at least some of the microlenses are diffractive microlenses to reduce a depth dimension with respect to the substrate.

45. A method of shaping an optical beam in a far field comprising the steps of:
transmitting the optical beam having an initial intensity profile through an array of microlenses defined by a set of parameters;
randomly varying two or more values of the set of parameters between the microlenses for individually shaping different portions of the optical beam according to a probability distribution function; and
recombining the different portions of the optical beam so the random variations imposed on the beam by the microlenses produce a more uniform intensity profile of the optical beam in the far field.

46. The method of claim 45 in which the parameters of the microlenses include a sag profile corresponding to a surface shape of the individual microlenses, a boundary profile corresponding to a boundary of the individual microlenses, and a spatial distribution corresponding to a relative position of the individual microlenses within the array, and the step of randomly varying includes randomly varying values of two or more of the parameters of sag profile, boundary profile, and spatial distribution.

47. The method of claim 46 in which the sag profile is defined by a plurality of variables and at least two of the plurality of sag profile variables are randomly varied within allowed ranges according to the probability distribution function.

48. The method of claim 47 in which the sag profile variables include radii of curvature, conic constants, and aspheric coefficients of a sag function mathematically representing the sag profile.

49. The method of claim 46 in which the boundary profile is defined at least in part by a diameter, and the diameter of the boundary profile is randomly varied between the microlenses according to the probability distribution function.

50. The method of claim 46 in which values of the boundary profile vary between the microlenses, such that at least some of the microlenses have a conforming boundary that scatters evenly powered portions of the optical beam into a matching shaped far-field pattern and other of the microlenses have a non-conforming boundary that scatters evenly powered portions of the optical beam into a far-field pattern that does not match the shape of the non-conforming boundary profile.

51. The method of claim 50 including a step of applying focusing power both to the portions of the optical beam scattered by the microlenses having conforming boundaries and to the portions of the illuminating beam scattered by the microlenses having non-conforming boundaries.

52. The method of claim 51 including a step of arranging the microlenses with conforming boundaries into a spatial distribution that minimizes the remaining area of the microlenses with non-conforming boundaries.

53. The method of claim 50 including a step of arranging the microlenses with conforming boundaries in groups and spaced apart by microlenses with non-conforming boundaries to produce spatially isolated sections of the illuminating beam.

54. The method of claim 45 in which the sag profile is defined by a sag function containing at least one phase singularity for producing a null in a far-field scatter pattern.

55. The method of claim 54 in which the phase singularity contributes to the generation of multiply-connected scatter shapes within the scatter pattern.

56. An optical device for shaping an optical beam comprising:
an optical substrate;
an array of microlenses distributed on the substrate;
a first set of the microlenses having conforming boundaries that scatter evenly powered portions of the illuminating beam into a matching shaped far-field pattern;
the first set of microlenses having surfaces being defined according to a sag function;
a second set of microlenses having non-conforming boundaries that scatter evenly powered portions of the optical beam into a far-field pattern that does not match the shape of the non-conforming boundary profile; and
the second set of microlenses having surfaces being defined according to a similar sag function based on intermediate calculational boundaries that overlap areas of both the conforming and non-conforming boundaries.

57. The device of claim 56 in which surfaces of the second set of microlenses are defined by portions of the similar sag function corresponding to the intersection of the areas within the intermediate calculational boundaries with the areas within the non-conforming boundaries of the second set of microlenses.

58. The device of claim 56 in which both the conforming boundaries and the intermediate calculational boundaries have a first shape and the non-conforming boundaries have a second shape.

59. The device of claim 56 in which both the first and second sets of microlenses are defined by sag profiles exhibiting focusing power.

60. The device of claim 56 in which values of the sag functions between the microlenses of both the first and second sets of microlenses vary randomly within allowed ranges to produce a more uniform far-field intensity distribution of the optical beam.

61. The device of claim 56 in which the values of the sag function are varied between the microlenses of both the first and second sets of microlenses according to a probability distribution function.

62. The device of claim 56 in which the first set of the microlenses having conforming boundaries include partial microlenses that collectively exhibit conforming boundaries.

63. A method of optimizing a microlens array for shaping an illuminating beam comprising the steps of:
identifying a first set of microlenses having conforming boundaries that scatter evenly powered portions of the illuminating beam into a matching shaped far-field pattern;
describing surfaces of the microlenses with conforming boundaries according to a sag function;
identifying a second set of microlenses having non-conforming boundaries that scatter evenly powered portions of the optical beam into a far-field pattern that does not match the shape of the non-conforming boundary profile;
describing surfaces of the microlenses with non-conforming boundaries according to the sag function; and
varying values of the sag function between the microlenses of both the first and second sets of microlenses within allowed ranges to produce a more uniform far-field intensity distribution of the illuminating beam,
wherein the step of describing surfaces of the microlenses with non-conforming boundaries includes the sub-steps of defining intermediate calculational boundary shapes that overlap the non-conforming boundaries, describing surfaces of the intermediate calculational boundary shapes with the sag function, and describing the surfaces of the microlenses with non-conforming boundaries as overlapping portions of the surfaces within the intermediate calculational boundary shapes.

64. The method of claim 63 in which the step of describing surfaces of the microlenses with non-conforming boundaries includes the sub-steps of defining intermediate calculational boundary shapes that overlap the non-conforming boundaries, describing surfaces of the intermediate calculational boundary shapes with the sag function, and describing the surfaces of the microlenses with non-conforming boundaries as overlapping portions of the surfaces within the intermediate calculational boundary shapes.

65. The method of claim 63 in which the non-conforming boundaries are defined by closed regions surrounded by the conforming boundaries.

66. The method of claim 63 in which the steps of describing include applying focusing power to both (a) the portions of the illuminating beam scattered by the microlenses having conforming boundaries and (b) the portions of the illuminating beam scattered by the microlenses having non-conforming boundaries.

67. The method of claim 66 in which the step of varying values of the sag function includes varying the values according to a probability distribution function.

68. The method of claim 63 in which the steps up describing surfaces of the microlenses include associating a local coordinate system with the individual microlenses of the array for assigning values to the sag functions of the individual microlenses independently of other of the microlenses.

69. The method of claim 63 including a further step of associating a global coordinate system with a substrate for locating the individual microlenses with respect to each other.

70. The method of claim 63 in which the step of varying values of the sag function includes a limit on the depth of sag.

71. The method of claim 70 in which at least some of the microlenses are converted into equivalent diffractive microlenses.

* * * * *